United States Patent
Kichise et al.

(10) Patent No.: US 7,146,287 B2
(45) Date of Patent: Dec. 5, 2006

(54) RESOLVER SIGNAL PROCESSING METHOD AND PROCESSING APPARATUS

(75) Inventors: Hiroshi Kichise, Chiryu (JP); Yutaka Mori, Toyohashi (JP)

(73) Assignees: Favess Co., Ltd., Okazaki (JP); Toyoda Koki Kabushiki Kaisha, Kariya (JP); Koyo Seiko Co., Ltd., Chuo-ku (JP)

( * ) Notice: Subject to any disclaimer, the term of this patent is extended or adjusted under 35 U.S.C. 154(b) by 38 days.

(21) Appl. No.: 10/946,239

(22) Filed: Sep. 22, 2004

(65) Prior Publication Data

US 2005/0061087 A1 Mar. 24, 2005

(30) Foreign Application Priority Data

Sep. 24, 2003 (JP) .............................. 2003-331559
May 24, 2004 (JP) .............................. 2004-153412

(51) Int. Cl.
*G06F 15/00* (2006.01)
*B60L 1/00* (2006.01)

(52) U.S. Cl. ..................... 702/151; 180/446; 307/10.1

(58) Field of Classification Search .................. 702/9, 702/94, 95, 150, 151; 73/862.191, 862.326, 73/862.339; 180/400, 444, 44.6; 307/10.1; 318/661
See application file for complete search history.

(56) References Cited

U.S. PATENT DOCUMENTS

| | | | | |
|---|---|---|---|---|
| 6,891,283 | B1 * | 5/2005 | Fukumoto et al. | 307/10.1 |
| 6,892,588 | B1 * | 5/2005 | Nagase et al. | 73/862.326 |
| 6,929,089 | B1 * | 8/2005 | Asada | 180/446 |
| 2005/0016789 | A1 * | 1/2005 | Asada | 180/444 |

* cited by examiner

*Primary Examiner*—Bryan Bui
*Assistant Examiner*—John Le
(74) *Attorney, Agent, or Firm*—Oblon, Spivak, McClelland, Maier & Neustadt, P.C.

(57) ABSTRACT

The electrically-powered steering apparatus obtains a steering torque and a steering angle within an allowable input range of those inputted into a first resolver and a second resolver based on a real zero point α and further, a steering torque and a steering angle out of the allowable input range of those inputted to the first resolver and the second resolver based on (+) virtual zero point β and (−) virtual zero point γ, which are set to a different value from the real zero point α. Consequently, of the steering torques and steering angles inputted to the first resolver and the second resolver, the steering torque and steering angle out of the allowable input range impossible to obtain by the real zero point α can be obtained based on the (+) virtual zero point β and the (−) virtual zero point γ.

10 Claims, 20 Drawing Sheets

Fig. 7

| TABLE No. | $\Delta\theta = \theta T1 \times 6 - \theta T2 \times 5$ | REPEAT NUMBER N1 | REPEAT NUMBER N2 | CORRECTION AMOUNT : b |
|---|---|---|---|---|
| 0 | $-1980 < \Delta\theta < -1620$ | 0 | 5 | -1800 deg |
| 1 | $-1620 < \Delta\theta < -1260$ | 4 | 4 | -1440 deg |
| 2 | $-1260 < \Delta\theta < -900$ | 3 | 3 | -1080 deg |
| 3 | $-900 < \Delta\theta < -540$ | 2 | 2 | -720 deg |
| 4 | $-540 < \Delta\theta < -180$ | 1 | 1 | -360 deg |
| 5 | $-180 < \Delta\theta < 180$ | 0 | 0 | 0 deg |
| 6 | $180 < \Delta\theta < 540$ | 4 | 5 | 360 deg |
| 7 | $540 < \Delta\theta < 900$ | 3 | 4 | 720 deg |
| 8 | $900 < \Delta\theta < 1260$ | 2 | 3 | 1080 deg |
| 9 | $1260 < \Delta\theta < 1620$ | 1 | 2 | 1440 deg |
| 10 | $1620 < \Delta\theta < 1980$ | 0 | 1 | 1800 deg |
| 11 | $1980 < \Delta\theta < 2340$ | 4 | 0 | 2160 deg |

RESOLVER SIGNAL PROCESSING METHOD AND PROCESSING APPARATUS

CROSS-REFERENCE TO RELATED APPLICATION

The present application claims priority under 35 U.S.C. §119 to Japanese Patent Application No. JP2003-331559 A and JP2004-153412 A. The content of the applications is incorporated herein by reference.

BACKGROUND OF THE INVENTION

1. Field of the Invention

The present invention relates to a resolver signal processing method and apparatus for obtaining data value (for example, rotation torque or rotation angle) relating to rotation inputted into these plural resolvers by arithmetic operation based on resolver signals outputted from plural resolvers having a different number of counter electrodes.

2. Description of the Related Art

Conventionally, as a means for detecting a rotation torque or a rotation angle using plural (for example, two) resolvers having a different number of counter electrodes, an absolute position detecting apparatus disclosed in a following patent document 1 has been well known. In the absolute position detecting apparatus of this patent document 1, an input shaft and an output shaft are connected to each other through a torsion bar so as to detect a rotation angle of the input shaft by a first resolver and a rotation angle of the output shaft by a second resolver. Consequently, a rotation torque is computed based on the spring coefficient of the torsion bar which is twisted when both the shafts rotate relative to each other and a difference of the rotation angle between the both shafts, so as to achieve a torque sensor.

According to the prior art, the absolute position detecting apparatus capable of computing the absolute position (steering angle) of a handle to be inputted into a second resolver by using a deflection in cycle of the detection signals of both the resolvers is constituted of the second resolver capable of detecting a rotation angle of the output shaft and a motor resolver capable of detecting a rotation angle of an electric motor for generating an assist force for an electrically-powered steering. In the meantime, the rotation angle of an input shaft can be detected within a range of 360° by the first resolver and the second resolver.

Prior Art: JP 2003-75109 A is incorporated herein by reference.

In case of detecting a rotation torque and a rotation angle using plural resolvers each having a different counter electrode number, a reference value for computation is obtained from an outputted resolver signal by providing the resolver with a known rotation input serving as a reference and the rotation torque and the rotation angle are obtained by computation based on that reference value. Thus, as described later, a rotation input exceeding that range cannot acquire an appropriate computed value due to a limitation of the allowable input range, which is generated by a combination of plural resolvers each having a different counter electrode number.

More specifically, if in an electrically-powered steering, its torque sensor is constituted of for example, two resolvers each having a counter electrode number of 5 and a counter electrode number of 6, an input torque (steering torque) by the steering wheel is computed based on resolver signals outputted from these resolvers. In this case, as shown in FIG. 14, the input torque is computed based on a zero point (hereinafter referred to as real zero point) α which takes the input torque zero point of the steering wheel as a reference. Then, because when the resolvers each having the counter electrode number of 5 and the counter electrode number of 6 are combined, the input angle difference of both the resolvers is limited within a range of ±6° for the reason described later, if the torsion bar is twisted over this range, no appropriate output torque can be obtained by computation (inside of a dashed line ellipse in FIG. 14). Although usually, a rotation input exceeding this allowable input range is often restricted by a mechanical component such as a stopper mechanism, it is difficult to say that there is no possibility that the rotation input exceeding the allowable input range may occur due to a limit in the installation accuracy of each system component such as a resolver and torsion bar or a damage of the stopper mechanism.

Further, the installation accuracy of each system component is demanded strictly for the necessity of obeying the limitation of the allowable input range and securing as large a range of an actually measurable input torque as possible. Thus, the limitation of the allowable input range obstructs relaxing of the installation accuracy and makes it difficult to reduce installation cost. The reason why a flat portion exists on both ends of an input torque in the characteristic graph of the output torque to the input torque shown in FIG. 14 is that the rotation input is suppressed by the stopper mechanism in this range and the dotted line indicates an example of an output torque when no stopper mechanism is provided.

As shown in FIG. 15, it is considered that these problems can occur if the rotation angle sensor is constituted of plural resolvers. That is, when the resolvers each having the counter electrode number of 5 and the counter electrode number of 6 are combined, the input angle difference of both the resolvers is limited to the range of ±6° for the reason described later like the torque sensor described previously. Consequently, when the torsion bar is twisted over this range, no appropriate output torque can be obtained by computation (inside of a dashed line ellipse in FIG. 15).

SUMMARY OF THE INVENTION

The present invention has been accomplished to solve the above-described problem and an object of the invention is to provide are solver signal processing method and apparatus capable of enlarging an appropriate computation possible range and relaxing the installation accuracy of the resolvers and system components constituting its surroundings.

To achieve the above object, according to a first aspect of the present invention, a first step for obtaining a data value within a predetermined range of data values relating to rotations inputted to the plural resolvers based on "data value relating to the rotation obtained from a known rotation input serving as a reference" set as a first reference value; and a second step for obtaining a data value out of the predetermined range of the inputted data values relating to the rotations based on a second reference value set to a different value from the first reference value. Consequently, data value out of the predetermined range, which cannot be obtained based on the first reference value, of data values relating to rotations inputted to plural resolvers, can be obtained based on the second reference value.

Then, according to a second aspect of the present invention, the second reference values are set in the quantity of one or more each for a value higher than the first reference value and a value smaller than the first reference value. Consequently, data value which exceeds the upper limit and lower limit based on the first reference value also can be obtained based on the second reference value set on both sides.

According to a third aspect of the present invention, the second reference value is set to data value relating to the rotation offset by a predetermined value with respect to the first reference value. Consequently, if the first reference value is set up, the second reference value can be set up based thereon.

According to a fourth aspect of the present invention, the second reference value is a rotation input offset by only a predetermined angle with respect to a known rotation input serving as the reference and set to data value relating to the rotation obtained from the data values possible to compute in the first step. Consequently, the second reference value can be set up from the side of the rotation input inputted to the resolvers.

According to a fifth aspect of the present invention, the second reference value is set to a data value relating to the rotation within the predetermined range obtained in the first step. Consequently, each time when data value relating to a rotation in the predetermined range is obtained in the first step, the second reference value can be updated.

According to a sixth aspect of the present invention, there is provided the resolver signal processing method according to the aforementioned first to fifth aspect, which is applied to a torque sensor so constructed that a twisting angle of the torsion bar is capable of being detected by the plural resolvers. Consequently, a particular operation to these processing methods can be obtained in that torque sensor also.

According to a seventh aspect of the present invention, there is provided the resolver signal processing method according to the first to fifth aspect, which is applied to an angle sensor so constructed that an identical rotation is capable of being inputted to the plural resolvers. Consequently, a particular operation to these processing methods can be obtained in that angle sensor also.

To achieve the above described object, according to an eighth aspect of the present invention, a first means for obtaining a data value within a predetermined range of data values relating to rotations inputted to the plural resolvers based on "data value relating to the rotation obtained from a known rotation input serving as a reference" set as a first reference value; and a second means for obtaining a data value out of the predetermined range of the inputted data values relating to the rotations based on a second reference value set to a different value from the first reference value. Consequently, data value out of the predetermined range which cannot be obtained based on the first reference value of data values relating to rotations inputted to plural resolvers can be obtained based on the second reference value.

Further, to achieve the above described object, according to a ninth aspect of the present invention, if data value relating to the rotation obtained in the first step is not within a predetermined specific value range specified by the specific range at a initialization processing of the apparatus having the plural resolvers by a third step, setting the data value relating to the rotation to zero. For example even if the initialization processing of the apparatus is carried out with a rotation inputted to the torsion bar, if data value relating to rotations obtained in the first step is within a predetermined specific value range, that data value becomes a data value obtained in the first step and if it is not within the predetermined specific value range, that data value is set to zero in the third step. Consequently, data value departing from the predetermined specific value range is set to zero and thus, even if an operation error occurs in the first step just after the initialization processing, the fault can be corrected.

Further, to achieve the above described object, according to a tenth aspect of the present invention, at the initialization processing, a difference between the data value relating to the rotation obtained by the first step or the second step and the data value relating to the rotation is not within a predetermined range, setting the data value of the rotation to zero. For example, if the difference between the data value relating to rotation obtained by the first step or the second step and the data value of the newest rotation is within the predetermined value range despite the initialization processing of that apparatus with a rotation inputted to the torsion bar preliminarily, that data value becomes data value obtained from the first step or the second step. If that difference is not within the predetermined range, data value obtained by the first step and the second step is set to zero at the fourth step. Consequently, if the difference between the currently obtained data value and the previously obtained data value departs from the predetermined value range, the currently obtained data value is set to zero. Therefore, even if an operation error occurs in the first step or the second step just after the initialization processing, this fault can be corrected.

According to the first and eighth aspect of the present invention, of data values relating to rotations inputted to plural resolvers, data value out of the predetermined range, which cannot be obtained based on the first reference value, can be obtained based on the second reference value. That is, by setting the second reference value, the data value relating to the rotation inputted to the plural resolvers, which is impossible to cover by the computation based on the first reference value, can be obtained by arithmetic operation. Thus, an appropriate computation possible range can be expanded and further, by expanding that appropriate computation possible range, the necessity of controlling the installation accuracy of the resolvers and system components constituting the surroundings vanishes. Consequently, the installation accuracy can be relaxed and installation cost can be reduced.

According to the second aspect, data values exceeding the upper limit and the lower limit of the first reference value can be obtained based on the second reference value set on both sides. That is, by setting the second reference value on both sides of the first reference value, the data values relating to the rotation inputted to the plural resolvers can be obtained about the upper and lower limits which cannot be covered by computation based on the first reference value. Thus, the appropriate computation possible range can be expanded on both sides of the upper limit and lower limit, so that an appropriate computation possible range can be expanded more widely. Consequently, the installation accuracy of the resolvers and system components constituting the surroundings can be relaxed further and installation cost can be reduced further.

According to the third aspect, because if the first reference value is set up, the second reference value can be set up based thereon, the setting algorithm for the second reference value can be constructed simply. Therefore, a computer program and the like for setting the second reference value can be designed and manufactured easily, thereby leading to reduction in development man-hour for that program and the like.

According to the fourth aspect, because the second reference value can be set up from the side of the rotation inputted to the resolver, the second reference value can be set up aiming at the vicinity of the upper limit or the lower limit of the predetermined range based on the first reference value. Therefore, an appropriate computation possible range to be expanded by the second reference value can be expanded to a maximum extent toward the upper limit or the lower limit.

According to the fifth aspect of the present invention, the second reference value can be updated each time when the data value relating to the rotation within the predetermined range is obtained by the first step. Consequently, the second reference value can be set up corresponding to the situation of an rotation input changing with a passage of time. Therefore, the appropriate computation possible range to be expanded by the second reference value can be expanded to be capable of following up changes in the rotation input.

According to the sixth aspect of the present invention, the particular operation which can be obtained by the resolver signal processing method according to the first to fifth aspect can be obtained by that torque sensor. Thus, respective effects provided by that operation can be enjoyed by that torque sensor.

According to the seventh aspect of the present invention, the particular operation which can be obtained by the resolver signal processing method according to the first to fifth aspect can be obtained by that angle sensor. Thus, respective effects provided by that operation can be enjoyed by that angle sensor.

Because according to the ninth aspect, the data value departing from the predetermined specific value range is set to zero, even if an operation error occurs in the first step just after the initialization processing, that fault can be corrected. Thus, the appropriate computation possible range can be expanded by the resolver signal processing method according to the first to seventh aspect of the invention in order to prevent a computation of an abnormal value just after the initialization processing is executed.

According to the tenth aspect of the present invention, if the difference between the currently obtained data value and the previously obtained data value departs from the predetermined value range, a currently obtained data value is set to zero. Thus, even if an operation error occurs in the first step or the second step just after the initialization processing, that fault can be corrected. Thus, the appropriate computation possible range can be expanded by the resolver signal processing method according to the first to seventh aspect of the invention in order to prevent a computation of an abnormal value just after the initialization processing is executed.

BRIEF DESCRIPTION OF THE DRAWINGS

FIG. 7 is a diagram showing an example of table for obtaining a correction amount b and repeat numbers N1, N2 from an electric angle difference $\Delta\theta$ between the first resolver and the second resolver;

DESCRIPTION OF THE PREFERRED EMBODIMENTS

Hereinafter, the embodiment of the resolver signal processing method and processing apparatus of the present invention will be described with reference to the accompanying drawings. An example in which the resolver signal processing method and processing apparatus of the present invention are applied to a processing of resolver signals outputted from the first resolver and second resolver which constitute an electrically-powered steering apparatus for vehicle will be described with reference to FIGS. 1–13. First, the structure of an electrically-powered steering apparatus 20 of this embodiment will be described with reference to FIGS. 1–4.

Figure 1:
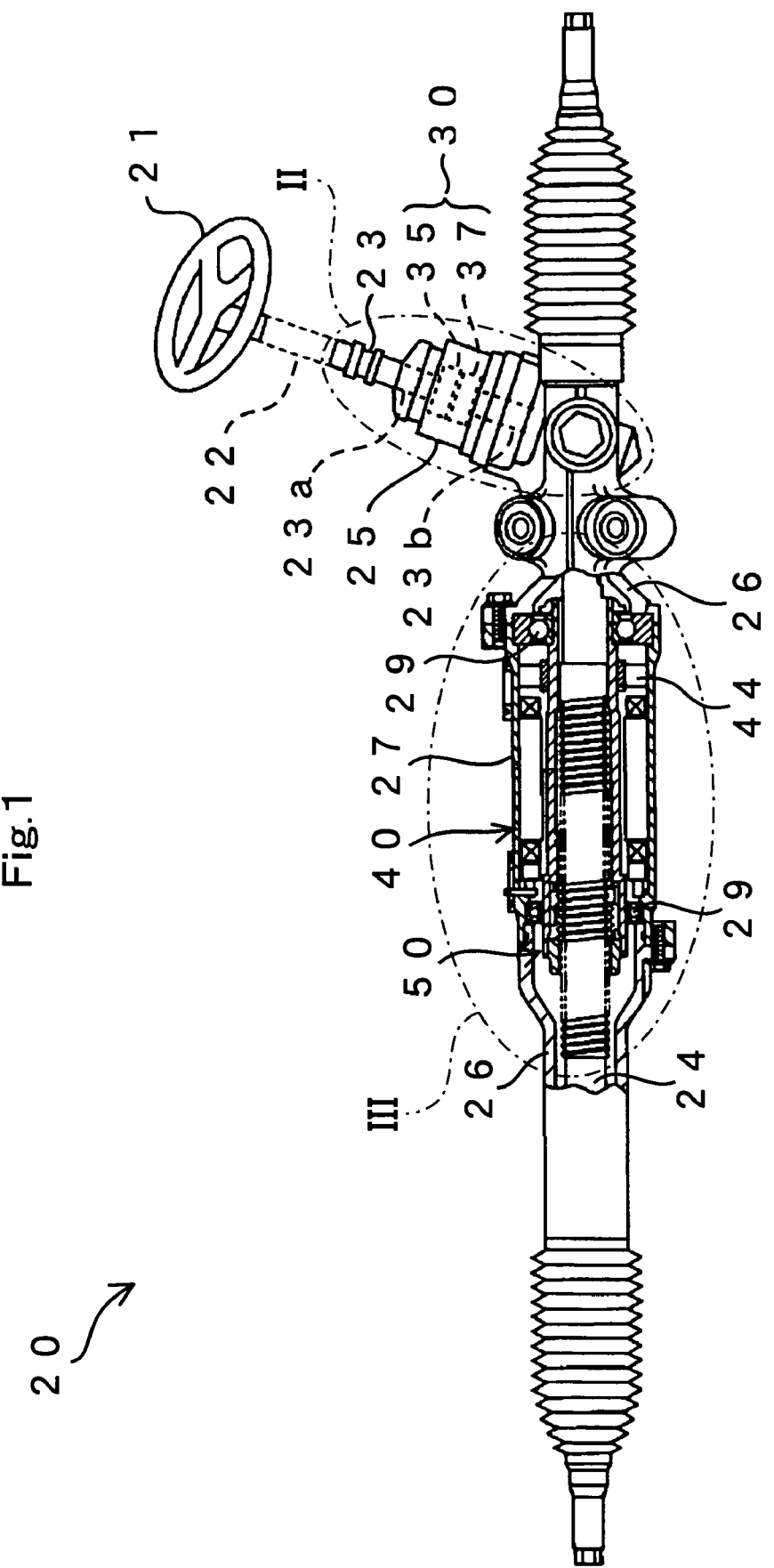
FIG. 1 is a structure diagram showing the structure of an electrically powered steering unit of the embodiment of the present invention.
Figure 4:
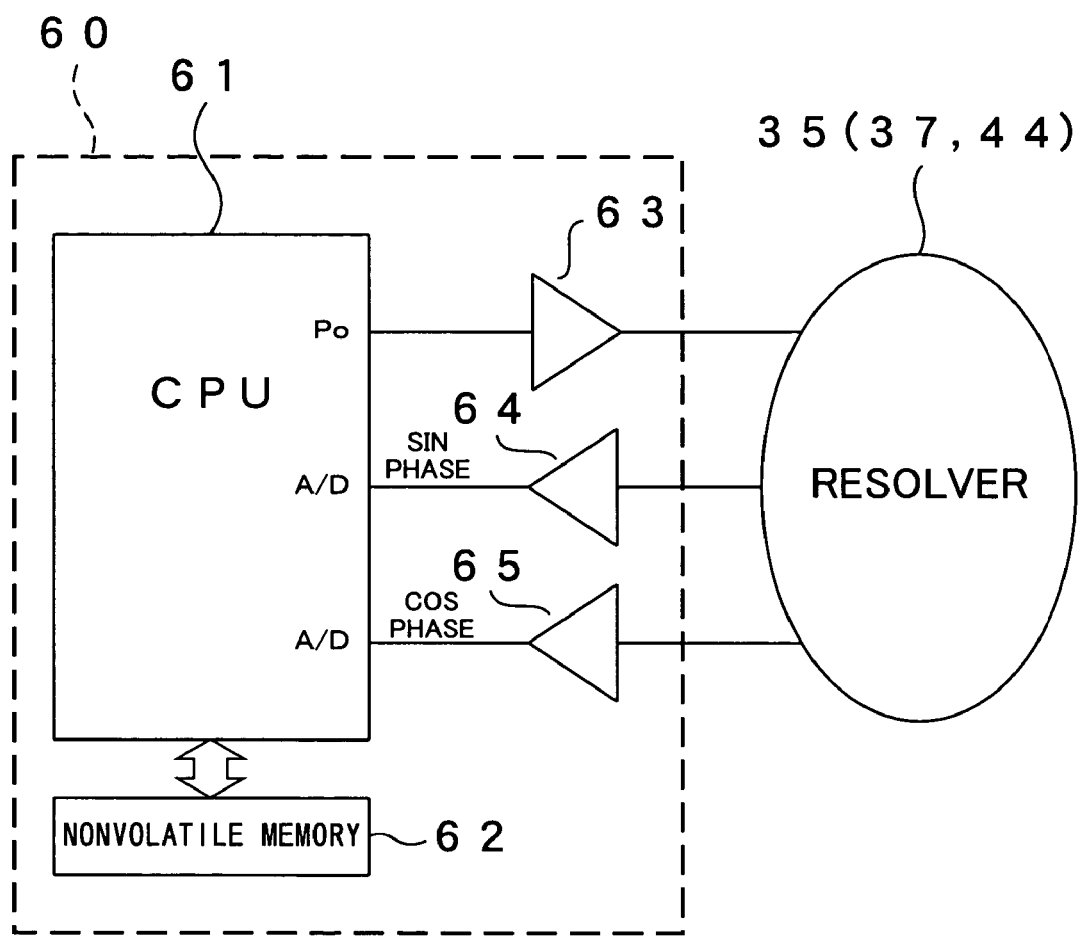
FIG. 4 is a block diagram showing a connection structure between the ECU for controlling the electrically-powered steering unit of the embodiment and a resolver.

As shown in FIGS. 1, 4, the electrically-powered steering apparatus 20 comprises mainly a steering wheel 21, a steering shaft 22, a pinion shaft 23, a rack shaft 24, a torque sensor 30, a motor 40, a motor resolver 44, a ball screw mechanism 50, an ECU 60 and the like, and detects a steering condition of the steering wheel 21 by means of a torque sensor 30 and generates an assist force by a motor 40 corresponding to that steering condition so as to assist the steering operation by a vehicle driver. Wheels (not shown) are coupled on both sides of the rack shaft 24 through a tie-rod and the like.

Figure 2:
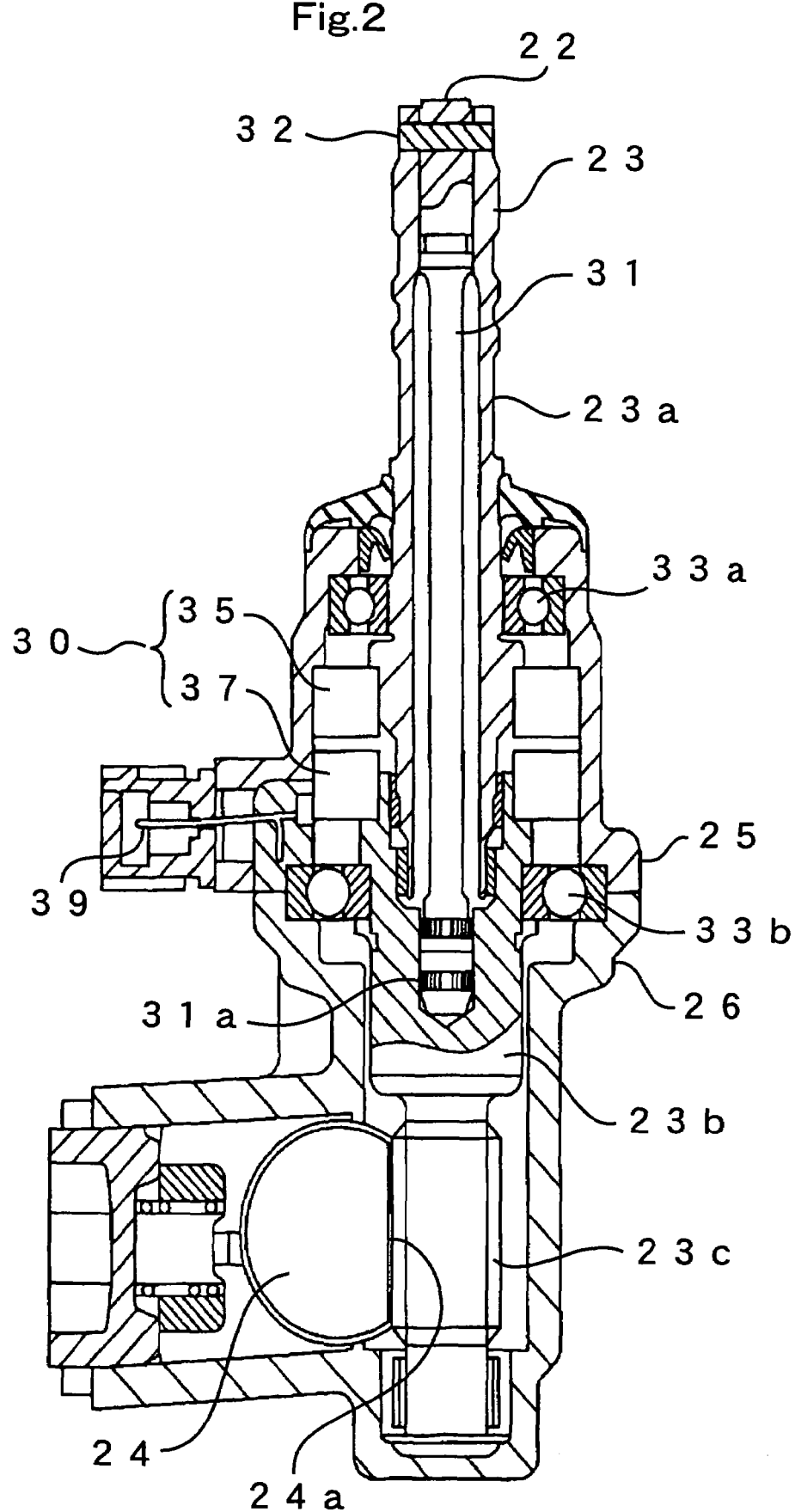
FIG. 2 is an enlarged diagram of an area within an ellipse indicated with a dot and dash line II in FIG. 1.

As shown in FIGS. 1, 2, an end of the steering shaft 22 is connected to the steering wheel 21 while an input shaft 23a of a torque sensor 30 and a torsion bar 31 accommodated within a pinion housing 25 are coupled to the other end of the steering shaft 22 through a pin 32. The output shaft 23b of the pinion shaft 23 is coupled to the other end 31a of the torsion bar 31 through a spline coupling.

The input shaft 23a of this pinion shaft 23 and the output shaft 23b are supported rotatably within the pinion housing 25 by a bearing 33a and a bearing 33b respectively. A first resolver 35 is provided between the input shaft 23a and the pinion housing 25 and the second resolver 37 is provided between the output shaft 23b and the pinion housing 25. The first resolver 35 and the second resolver 37, which constitute the torque sensor 30, are capable of detecting a rotation angle by the steering wheel 21 and connected electrically to an ECU 60 through a terminal 39 (see FIG. 4). A pinion gear 23c is formed at an end portion of the output shaft 23b of the pinion shaft 23 and a rack groove 24a of a rack shaft 24 is connected to this pinion gear 23c such that it is capable of engaging therewith. Consequently, a rack and pinion type steering mechanism is constructed.

Figure 3:
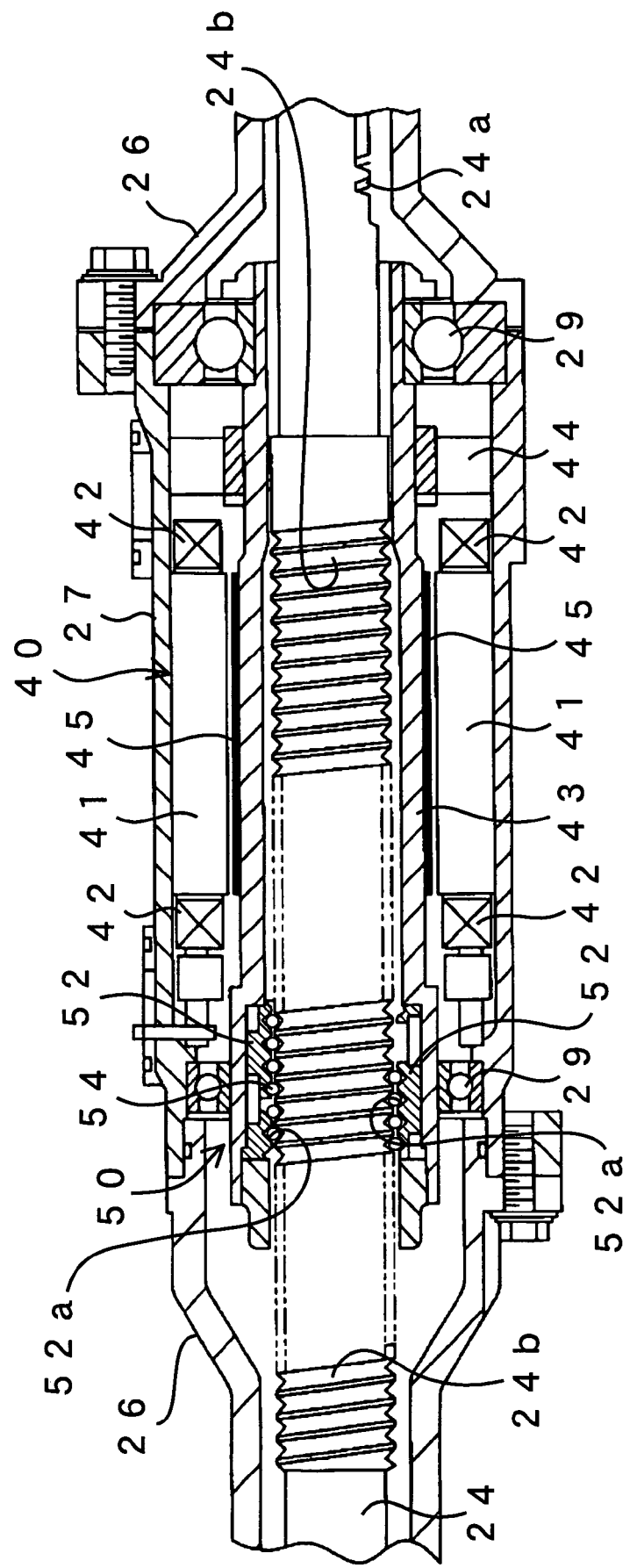
FIG. 3 is an enlarged diagram of an area within an ellipse indicated with a dot and dash line III in FIG. 1.

As shown in FIGS. 1, 3, the rack shaft 24 is accommodated within the rack housing 26 and the motor housing 27 and at that midpoint a screw groove 24b is formed spirally. A cylindrical motor shaft 43 is provided around this ball screw groove 24b, the motor shaft being supported rotatably by a bearing 29 coaxially with the rack shaft 24. This motor shaft 43 constitutes a motor 40 with a stator 41, an excitation coil 43 and the like. A magnetic field generated by an excitation coil 42 wound around the stator 41 acts on a permanent magnet 45 provided around the outer periphery of the motor shaft 43, which is equivalent to a rotor, so as to rotate the motor shaft 43.

A ball screw nut 52 is mounted on the inner periphery of the motor shaft 43 and a ball screw groove 52a is formed spirally in this ball screw nut 52. Thus, a plurality of balls 54 are interposed between the ball screw groove 52a in the ball screw nut 52 and the ball screw groove 24b in the rack shaft 24 such that they are capable of rolling, thereby constructing a ball screw mechanism 50 in which the rack shaft 24 is capable of moving in the axial direction with a rotation of the motor shaft 43.

That is, the ball screw mechanism 50 constituted of both the ball screw grooves 24b, 52a and the like can convert a rotation torque in normal and reverse directions of the motor shaft 43 to a reciprocating motion in the axial direction of the rack shaft 24. Consequently, this reciprocating motion acts as an assist force for reducing the steering force of the steering wheel 21 through the pinion shaft 23 which constitutes a rack and pinion type steering mechanism with the rack shaft 24. A motor resolver 44 capable of detecting a rotation angle (electric angle) $\theta$Me, rotation angle (electric angle) of motor shaft 43, is provided between the motor shaft 43 of the motor 40 and the motor housing 27, and this motor resolver 44 is connected electrically to the ECU 60 through a terminal (not shown)(see FIG. 4).

The ECU 60 comprises a CPU 61, a nonvolatile memory 62, buffer amplifiers 63, 64, 65 and the like. The first resolver 35, the second resolver 37 and the motor resolver 44 are connected electrically to the CPU 61 through buffer amplifiers 63, 64, 65 and the nonvolatile memory 62, a semiconductor memory unit as a main storage device (not shown) are connected to the CPU 61 through the system bus. In the meantime, programs and the like relating to the virtual zero point setting processing and resolver signal processing are stored in this main storage device.

The structure and electric characteristics of the first resolver 35, the second resolver 37 and the motor resolver 44 have been disclosed in detail in specifications of Japanese Patent Application No.2003-75109, Japanese Patent Application No.2002-196131 and Japanese Patent Application No.2003-73807.

With such a structure, a rotation angle of the steering shaft 22, that is, a rotation angle $\theta$Tm by the steering wheel 21 can be detected by an electric angle $\theta$T1 by the first resolver 35 and an electric angle $\theta$T2 by the second resolver 37. The amount of twisting (corresponding to a steering torque) of the torsion bar 31 can be detected from a difference in angle between the electric angle $\theta$T1 and the electric angle $\theta$T2, an angle ratio and the like, as a twisting angle. Because a steering torque T can be computed based on a relative rotation angle difference $\Delta\theta$, which is a twisting angle of the torsion bar 31 and a spring constant of the torsion bar 31, a well-known assist control for assisting the steering force corresponding to this steering torque T is carried out by the CPU 61 of the ECU 60. Consequently, steering operation by a vehicle driver can be assisted by a steering force generated by the motor 40. A rotation inputted to the first resolver 35 by the steering wheel 21 (steering shaft 22) and a rotation inputted by the second resolver 37 may correspond to "rotation inputted to plural resolvers" and the rotation angle $\theta$Tm and the steering torque T of the steering wheel 21 (steering shaft 22) may correspond to "data value relating to the rotation inputted to plural resolvers".

Because the first resolver 35 which is one of the resolvers which has a counter electrode number of 5 and constitute the torque sensor 30 has five pairs of N poles and S poles electrically 5, the electric angle $\theta$T1 obtained from the first resolver 35 possesses five peak points per a rotation (360°) of the steering wheel 21. Further, because this first resolver 35 is capable of outputting an electric angle corresponding to 360°×5=1800° relative to a mechanical angle of 360°, it possesses a resolution five times higher than a resolver of 360° in terms of electrical angle. Contrary to this, the electric angle $\theta$T2 obtained from the other second resolver 37 which constitutes the torque sensor 30 possesses six peak points per a rotation (360°) of the steering wheel 21. Because the second resolver 37 is a resolver having counter electrode number of 6 and possesses six pairs of N poles and S poles electrically, it is capable of outputting an electric angle equivalent to 360°×6=2160°. That is, the second resolver 37 has a resolution six times higher than the resolver having an electric angle of 360°.

Because the first resolver 35 outputs the electric angle $\theta$T1 as a resolver signal and the second resolver 37 outputs the electric angle $\theta$T2 as a resolver signal, both the signal waveforms never pick up the same value in the rotation angle (except a neutral point, ±360°, ±720°). Thus, if the CPU 61 executes arithmetic processing based on the electric angle $\theta$T1 of the first resolver 35 and the electric angle $\theta$T2 of the second resolver 37, the mechanical angle (rotation angle) $\theta$Tm can be automatically obtained within the range of a single rotation (360°) of the steering wheel 21.

Figure 5:
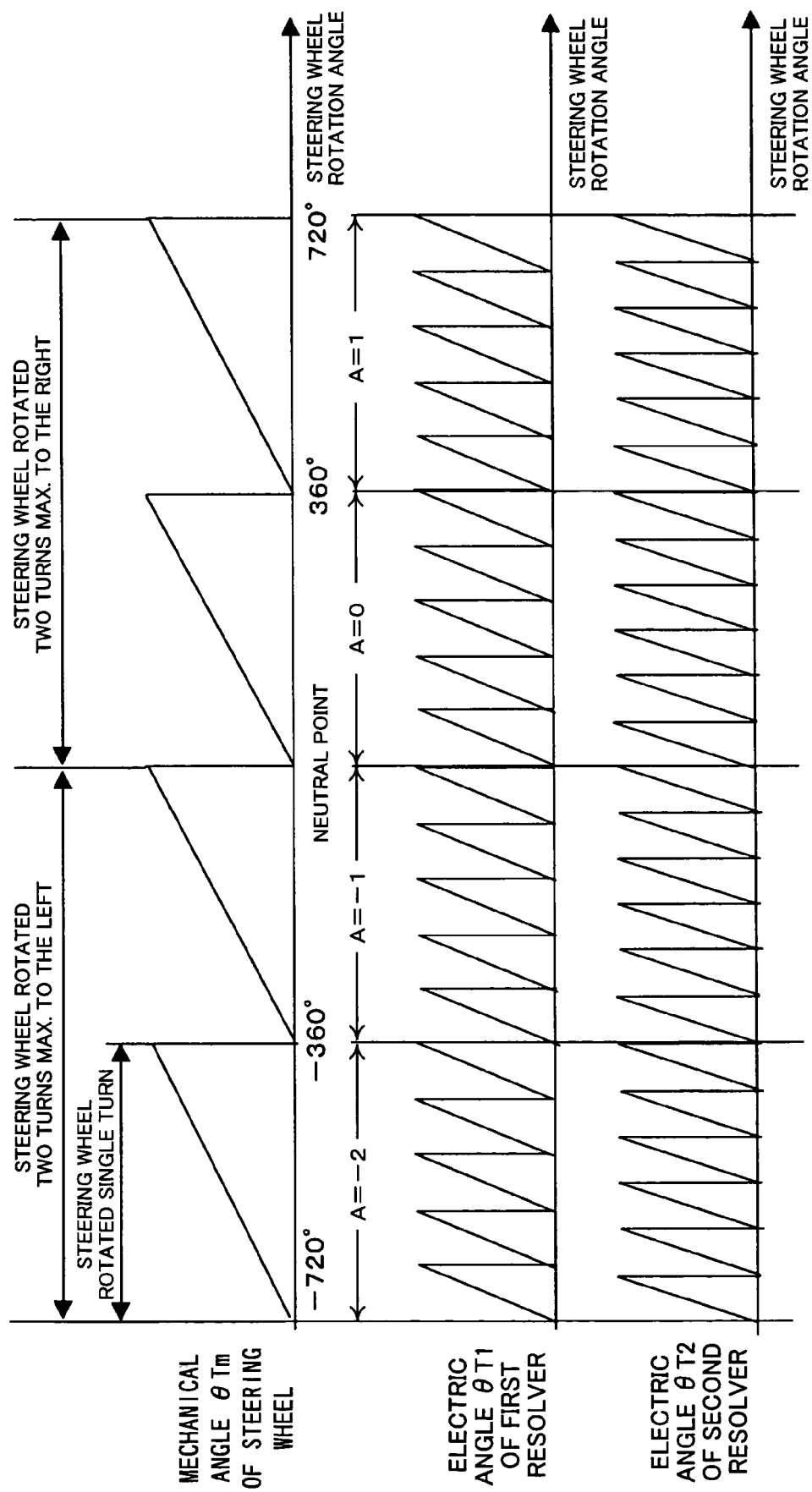
FIG. 5 is a characteristic diagram showing a resolver signal by the first resolver and second resolver to a rotation angle of a steering wheel and the mechanical angle of the steering wheel.
Figure 6:
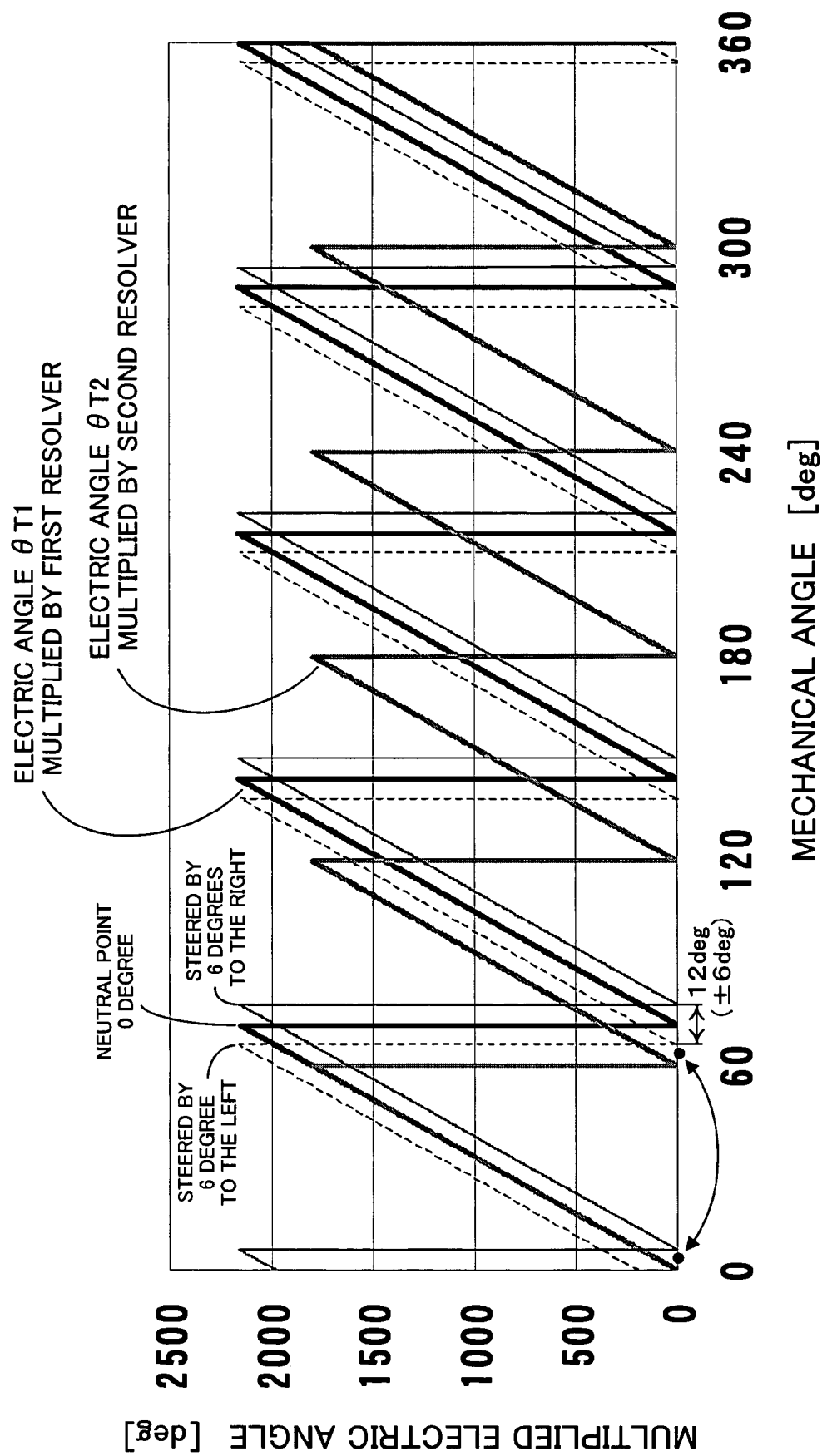
FIG. 6 is a characteristic diagram showing a multiplication of the revolver signal (electric angle) by the first resolver and the second resolver to the rotation angle of the steering wheel.

The electrically-powered steering apparatus 20 detects the steering torque T of the steering wheel 21 and the rotation angle $\theta$Tm by processing the resolver signal from the torque sensor constituted of the torsion bar 31, the first resolver 35 and the second resolver 37 as described above. As shown in FIG. 5, both the waveforms of these resolver signals have different inclinations because of a difference in the counter electrode number. Then, by increasing the electric angle θT1 of the first resolver 35 having the counter electrode number of 5 six times and the electric angle θT2 of the second resolver 37 having the counter electrode number of 6, the inclinations of both the waveforms can be matched with each other with respect to an input torque zero point (mechanical angle 0°) of the steering wheel 21 and the steering torque T can be obtained based on an electric angle outputted from the first resolver 35 and the second resolver 37. In FIG. 6, a graph expressed by a bold black solid line may correspond to the electric angle θT1 of the first resolver 35 while a graph expressed by a bold gray solid line may correspond to the electric angle θ T2 of the second resolver 37.

An algorithm for obtaining the steering torque T based on an electric angle outputted from the first resolver 35 and the second resolver 37 will be described simply with reference to FIGS. 7, 8. A deflection in the cycle between both the electric angles can be obtained as an electric angle difference Δθ (=θT1×6−θT2×5) by multiplying the electric angle θT1 of the first resolver 35 (counter electrode number 5) by 6 and the electric angle θT2 of the second resolver (counter electrode number 6) by 5. A correction amount b is obtained by classifying according to a table shown in FIG. 7 based on an electric angle difference Δθ. For the reason, the steering torque T can be computed by substituting this correction amount T to a torque value computation equation (T=(Δθ−b)×1.89/30). Further by substituting a repeat number N1 and the electric angle θ T1 of the first resolver 35 obtained from the table shown in FIG. 7 to the rotation angle computation equation (θTm=(θ T1+360×N1)/5), the rotation angle θTm of the steering wheel 21 can be computed.

Figure 8:
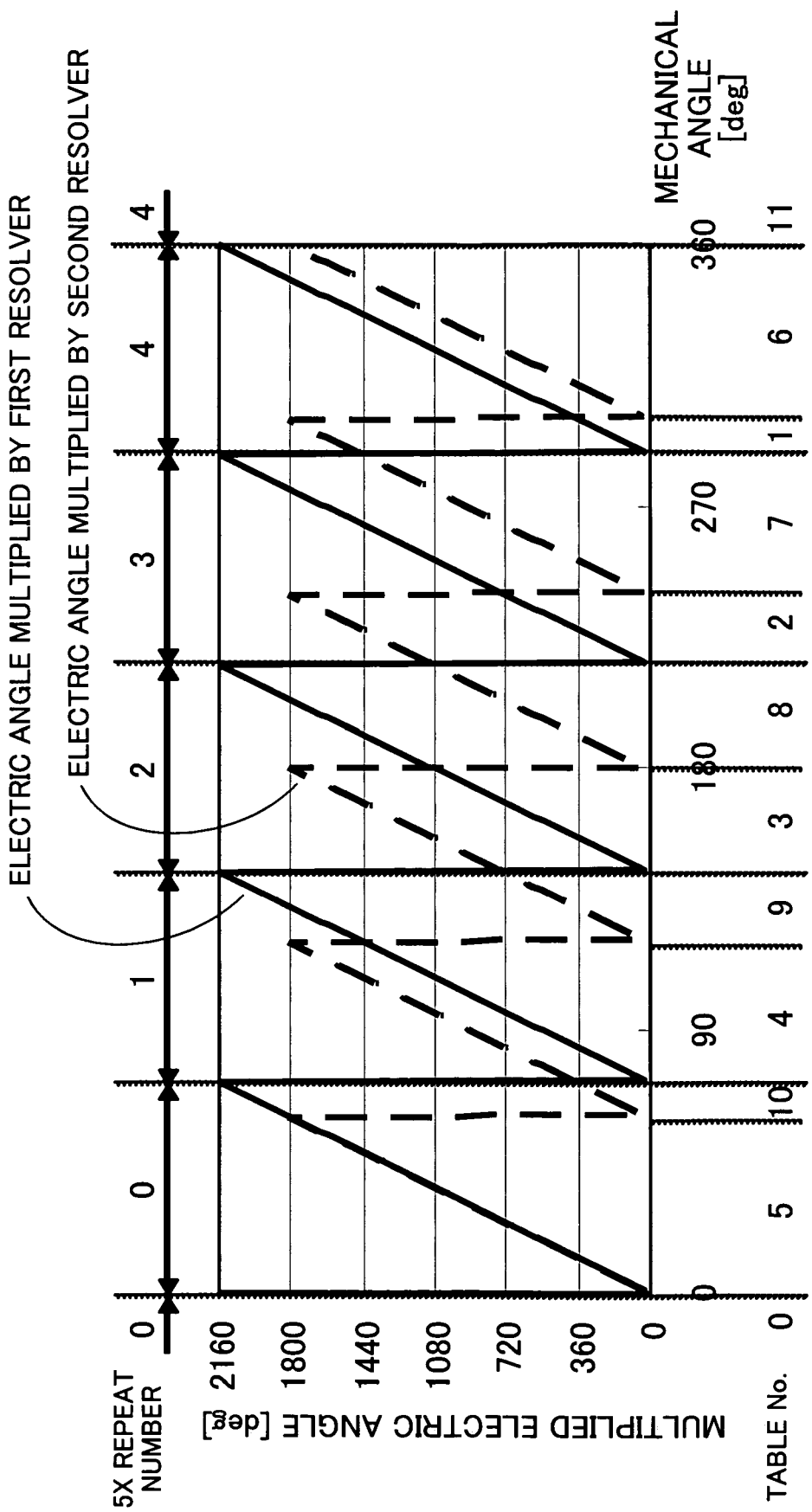
FIG. 8 is an explanatory diagram showing the relation between the characteristic diagram shown in FIG. 6 and the table shown in FIG. 7.

The relation between the table shown in FIG. 7 and the characteristic diagram of electric angles outputted from the first resolver 35 and the second resolver 37 shown in FIG. 8 is as follows. That is, because in the range (table No.5) of 0° to 60° in mechanical angle, a multiplied output of the first resolver 35 is equal to a multiplied output of the second resolver 37 (difference is 0°), the correction amount shown in FIG. 7 is set to 0°. Then, because the multiplied output of the second resolver 37 turns to 0° temporarily when the mechanical angle is 60°, there occurs a difference of 1800° between the multiplied output of the first resolver and the multiplied output of the second resolver 37 and this state continues until the output of the first resolver 35 turns to 0 while the mechanical angle is 72°, that is, in the range of 60° to 72° in mechanical angle. Thus, the correction angle b in this while is set to 1800°. Because the output of the first resolver 35 turns to 0° under the mechanical angle of 72°, there occurs a difference of −360° between the multiplied output of the first resolver 35 and the multiplied output of the second resolver 37 in the range of the mechanical angle of 72° to 120° (table No.4). For the reason, the correction amount in this while is set to −360°.

Because a difference in multiplied output between both the resolvers is 1440° in the range of 120° to 144° in mechanical angle (table No.9), the correction angle b is set to 1440°. Further, because the difference in multiplied output between both the resolvers is −720° in the range of 144 to 180° in mechanical angle (table No.3), the correction amount b is set to −720°. Further, because the difference in multiplied output between both the resolvers is 1080° in the range of 180° to 216° in mechanical angle, the correction amount b is set to 1080°. Further, because the difference in multiplied output between both the resolvers is −1080° in the range of 216° to 240° in mechanical angle (table No.2), the correction amount b is set to −1080°. Further because the difference in multiplied output between the both resolvers is 720° in the range of 240° to 288° in mechanical angle, the correction amount is set to 720°. Because the difference in multiplied output between the both resolvers is −1440° in the range of 288 to 300 in mechanical angle (table No.1), the correction amount b is set to −1440° Further, because the difference in multiplied output between the both resolvers is 360° in the range of 300° to 360° in mechanical angle (table No.6), the correction amount b is set to 360°. Further, because if the mechanical angle exceeds 360° (table No.11), the difference in multiplied output between the both resolvers turns to 2160°, the correction amount b is set to 2160°. Then, because finally, a difference between the multiplied output of the first resolver and the multiplied output of the second resolver 37 is −1800° when the mechanical angle is less than 0° (table No.0), the correction amount b is set to −1800°.

Because the classification of cases depending on the electric angle difference Δθ is carried out by setting each table No.0–No.11 to the width of ±180°, converting this width of ±180° to a mechanical angle (=180/30; 30 is a multiplication of a counter electrode number 5 of the first resolver 35 by 6) provides a width of ±6°. Because the electric angle θT1 by the first resolver 35 shown in FIG. 6 originates from an input torque zero point of the steering wheel 21, the correction amount b and the repeat numbers N1, N2 can be obtained according to a table which is effective within a graph indicated with a fine solid line (steered by 6° to the right) when it is steered to the right relative to the electric angle θT2 of the second resolver 37 and within a graph indicated with a fine dotted line (steered by 6° to the left) when it is steered to the left. Then, because the correction amount b or the like is given according to a table not belonging actually if an electric angle θT1 exceeding this range is inputted, no aforementioned appropriate computation value can be obtained.

Figure 14:
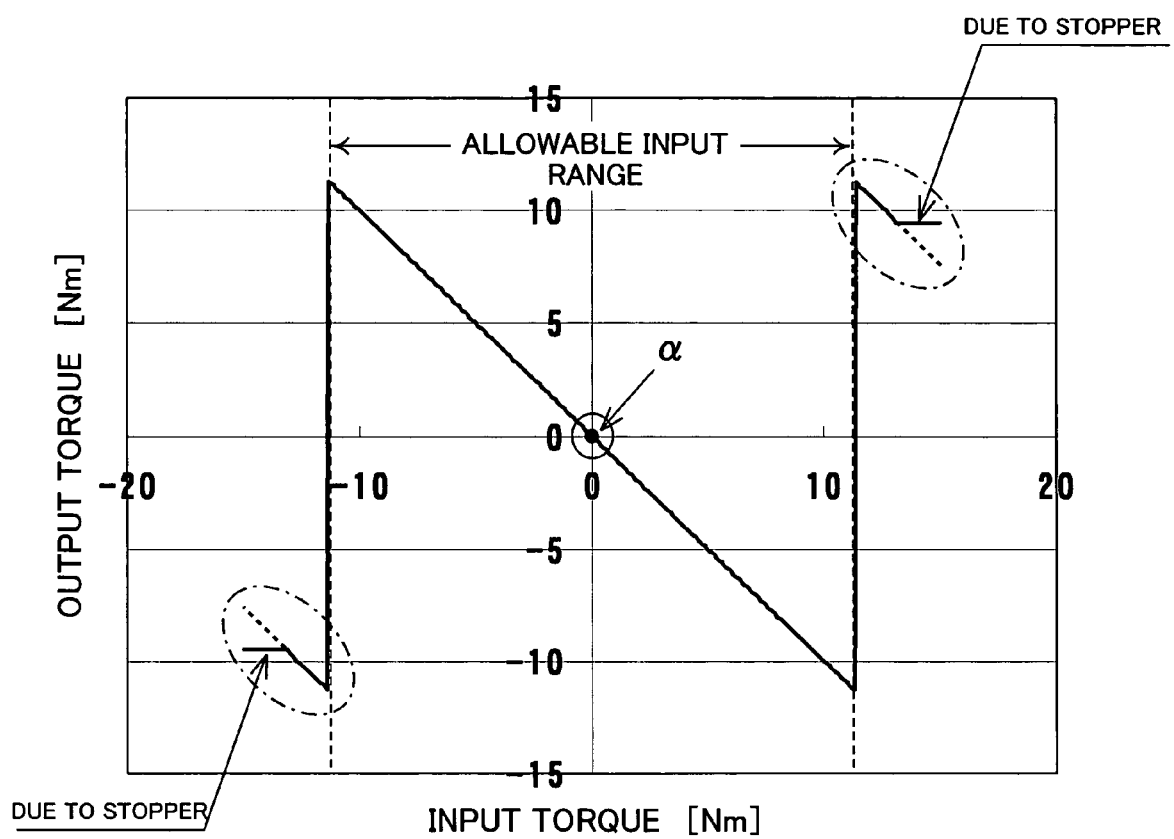
FIG. 14 is an explanatory diagram showing an example of output torque computed by the processing of a conventional resolver signal when a torque sensor is constituted of resolvers.

For example, if the electric angle θT1 is located at a value of a mechanical angle 72° without any torque applied to the steering shaft 22, when a large leftward directed torque is applied by vehicle driver's operating the steering wheel 21 and then, the electric angle exceeds a range provided by steering by 6° to the left and comes to pick up the value of a mechanical angle 64° (black dot to the right on horizontal axis shown in FIG. 6), this is misunderstood to be picking up the value of a mechanical angle 4° (black dot to the left). This is the reason that the processing is carried out assuming that the electric angle difference Δθ is within ±180° (range from 6° steered to the right to 6° steered to the left). FIG. 14 shows a computation on this table based on a relation between input torque and output torque and the allowable input range shown in the same Figure may correspond to the range of the electric angle θT1 of ±6° in case where a resolver having the counter electrode number 5 and a resolver having the counter electrode number 6 are combined.

That is, the input torque zero point (0 Nm) of the steering wheel 21 shown in FIG. 14 is set to a real zero point α and the output torque is computed based on this. Thus, if the steering wheel 21 is steered to the left direction from the real zero point α having input torque 0 Nm, the input torque changes to a minus direction and if the leftward steering torque is 10 Nm (−10 Nm), +10 Nm is obtained as the output torque. If the steering wheel 21 is steered further leftward beyond the allowable input range, the output torque changes rapidly from about +11 Nm to about −11 Nm as evident from the characteristic diagram shown in FIG. 14, so that apparently, a computation result that the sign is inverted as if the steering wheel 21 is steered rapidly from the leftward steering to the rightward steering is outputted.

According to this embodiment, in order to enable an appropriate computation even if an electric angle angel $\theta T1$ exceeding such a range is inputted, a (+) virtual zero point $\beta$ and (−) virtual zero point $\gamma$ are set up in addition to the real zero point a as described below to enable a solution of this problem. In the meantime, the limitation of the electric angle $\theta T1$ described above may correspond to "limitation of an allowable input range generated by a combination of plural resolvers having a different counter electrode number" described in the description of the related art and this allowable input range is a range of the electric angle $\theta T1$ of ±6° if a resolver having the counter electrode number 5 and a resolver having the counter electrode number 6 are combined.

Figure 9:
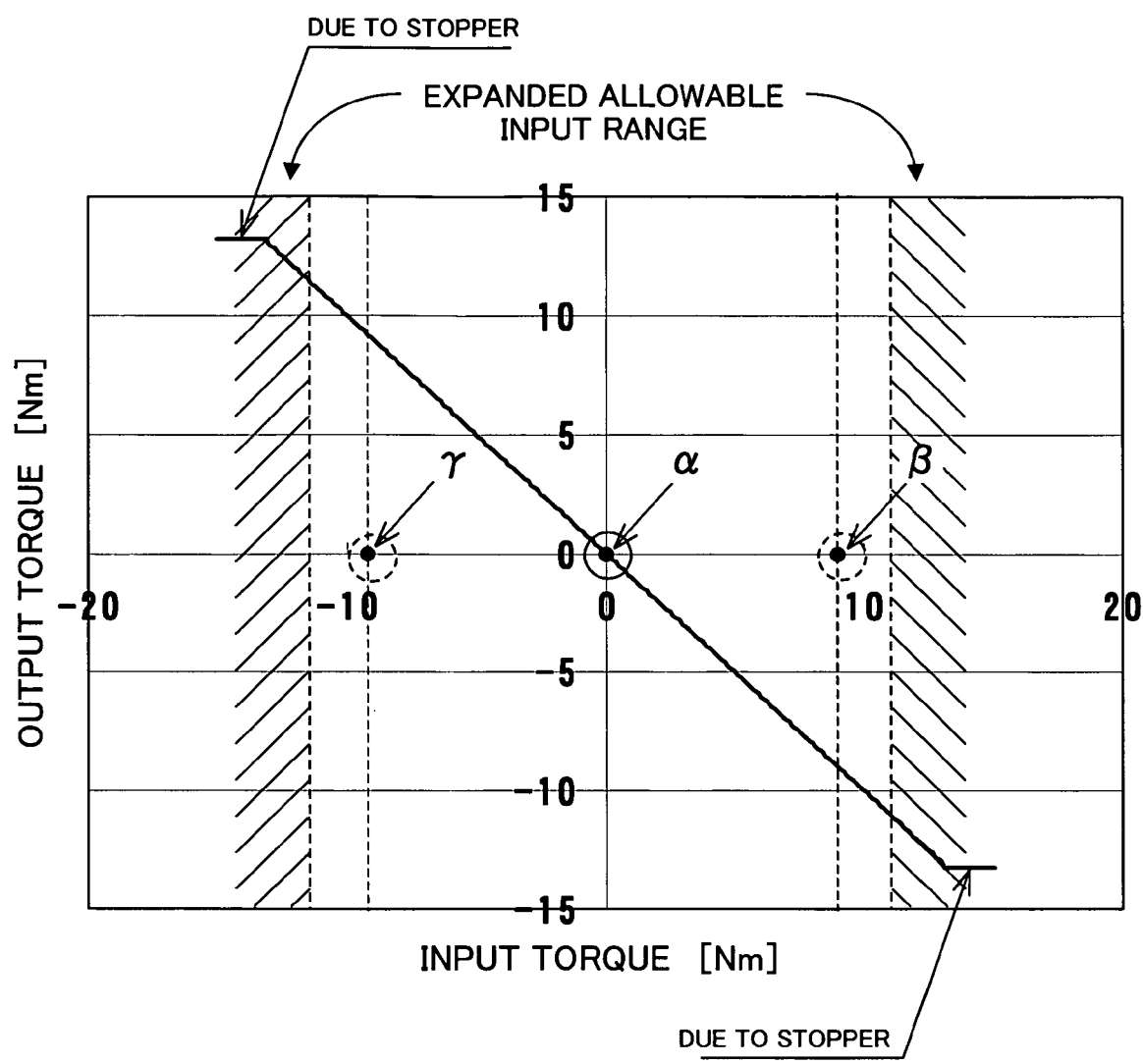
FIG. 9 is an explanatory diagram showing an example of an output torque computed by processing of the resolver signal of the embodiment.

That is, as shown in FIG. 9, according to this embodiment, by arithmetic processing on the resolver signals of obtaining a steering torque T to be inputted to the resolver and the rotation angle $\theta Tm$ based on a resolver signal outputted from the first resolver 35 and the second resolver 37 each having a different counter electrode number, the (+) virtual zero point $\beta$ and the (−) virtual zero point $\gamma$ are set up in addition to the real zero point $\alpha$ as shown in FIG. 14 and then, electric angles out of the allowable input range are obtained. Consequently, the electric angles which cannot be covered by computation based on the real zero point $\alpha$ (electric angles out of a shaded portion in FIG. 9) can be obtained by computation based on the (+) virtual zero point $\gamma$ and the (−) virtual zero point $\alpha$. That is, the allowable input range shown in FIG. 14 can be expanded about its upper limit and lower limit.

Here, the setting processing for a virtual zero point for setting the (+) virtual zero point $\beta$ and the like and an arithmetic processing of a resolver signal using the virtual zero point or the like will be described with reference to FIG. 10 and FIG. 11 respectively. The setting processing of this virtual zero point and the arithmetic processing of the resolver signals are carried out by the CPU 61 which constitutes the ECU 60.

Figure 10:
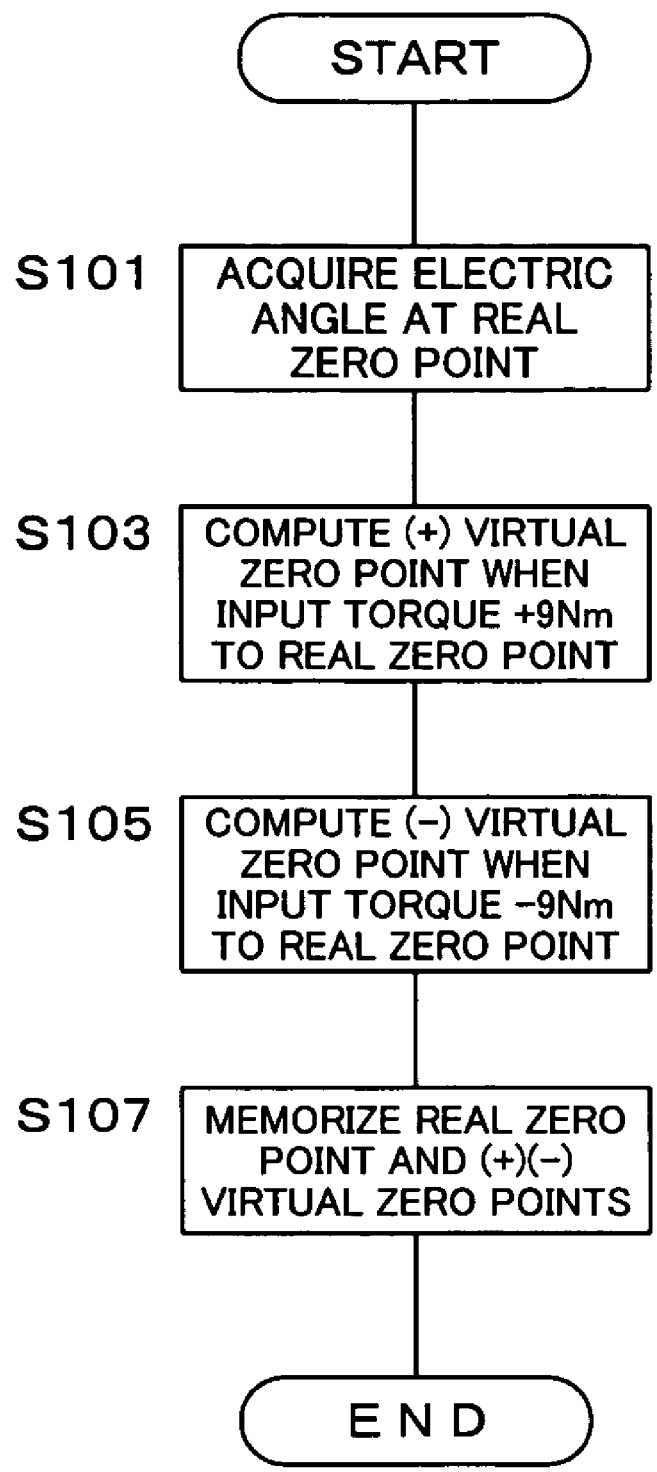
FIG. 10 is a flow chart showing a flow of setting processing for a virtual zero point for use in the arithmetic processing of the resolver signal of the embodiment.

In the setting processing of the virtual zero point, as shown in FIG. 10, a processing for obtaining an electric angle at a real zero point $\alpha$ is carried out in step S101. That is, a processing for obtaining electric angles $\theta T1$, $\theta T2$ is carried out based on resolver signals outputted from the first resolver 35 and the second resolver 37 at the input torque zero point of the steering wheel 21. Consequently, the real zero point $\alpha$ is set up.

Next in step S103, a correction value for a case where the input torque is increased by 9 Nm relative to the real zero point $\alpha$ is obtained by arithmetic operation and a processing for setting it as the (+) virtual zero point $\beta$ is carried out. Likewise a correction value for a case where the input torque is decreased by 9 Nm relative to the real zero point $\alpha$ is obtained by computation in step S105 and a processing for setting this value as the (−) virtual zero point $\gamma$ is carried out. That is, a processing for creating the (+) virtual zero point $\beta$ and the (−) virtual zero point $\gamma$ by off-setting the correction value corresponding to a specified torque (9 Nm here) in a plus direction and a minus direction relative to the real zero point $\alpha$ is carried out.

Then, a processing for memorizing the real zero point $\alpha$ set in step S101 and the (+) virtual zero point $\beta$ and the (−) virtual zero point $\gamma$ set up in steps S103, S105 in a nonvolatile memory 62 is carried out in step S107. Consequently, the virtual zero points $\beta$, $\gamma$ created in the form of software are memorized in the memory unit of the ECU 60 as well as the real zero point $\alpha$ and therefore, in a resolver signal arithmetic operation which will be explained below, arithmetic operation on an appropriate output torque can be carried out for an input torque in the range which cannot be computed at the real zero point $\alpha$ using the virtual zero points $\beta$, $\gamma$.

Because in the virtual zero point setting processing shown in FIG. 10, if the real zero point $\alpha$ is set up, the (+) virtual zero point $\beta$ and the (−) virtual zero point $\gamma$ can be set up based on that, the algorithm can be constructed in a simple way. Thus, a computer program for setting up the (+) virtual zero point $\beta$ and the (−) virtual zero point $\gamma$ can be designed and manufactured easily, thereby making it possible to reduce the development man-hour for that program.

Figure 11:
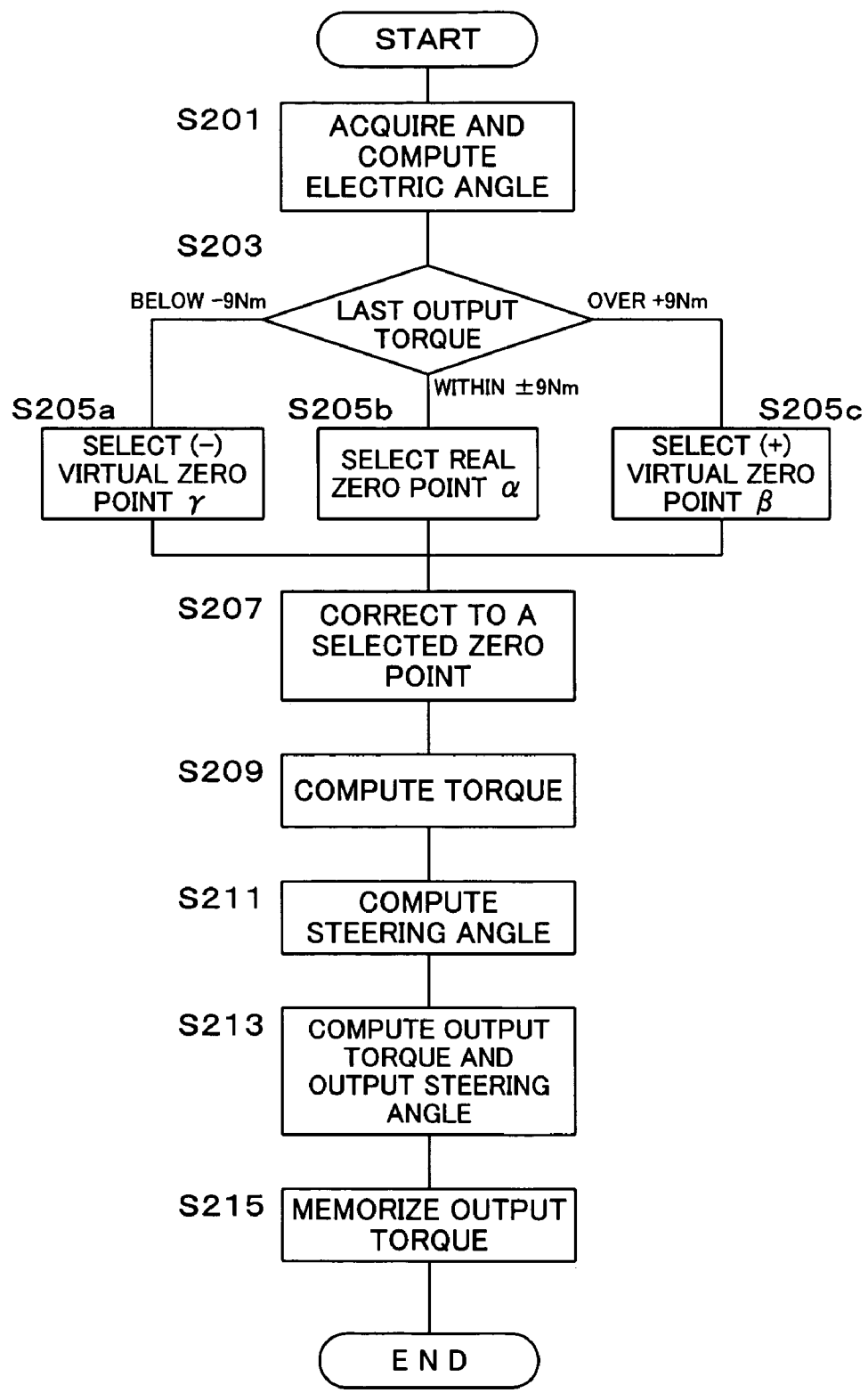
FIG. 11 is a flow chart showing a flow of the processing of the resolver signal of the embodiment.

The (+) virtual zero point $\beta$ and the (−) virtual zero point $\gamma$ set up in this way are used in arithmetic processing of the resolver signals shown in FIG. 11. In the resolver signal arithmetic processing, as shown in FIG. 11, a processing for obtaining the electric angle $\theta T1$ of the first resolver 35 and the electric angle $\theta T2$ of the second resolver 37 and computing is carried out in step S201. That is, a processing of obtaining a current steering torque (data value concerning the rotation) inputted to the first resolver 35 and the second resolver 37 which constitute the torque sensor 30 is carried out.

In subsequent step S203, a processing for reading out an output torque computed and memorized by the resolver signal arithmetic processing and determining in which range a previous output torque is located is carried out. More specifically, whether the previous output torque is located below the (−) virtual zero point $\gamma$ (−9 Nm) set by the above-described virtual zero point setting processing, whether over the (+) virtual zero point $\beta$ (+9 Nm) and whether it is located within a range of ±9 Nm around the real zero point $\alpha$ is determined. Then, if the previous output torque is less than −9 Nm, the (−) virtual zero point $\gamma$ is selected in step S205*a*, and if over +9 Nm, the (+) virtual zero point $\beta$ is selected in step S205*c* and if within the range of ±9 Nm, the real zero point $\alpha$ is selected in step S205*b*.

That is, because if the previous output torque is located within the range of ±9 Nm with respect to the real zero point $\alpha$, the possibility that the output torque can be computed to a current input torque with respect to the real zero point $\alpha$ like the conventional case shown in FIG. 14, the real zero point $\alpha$ is selected in step S205*b*. On the other hand, if the previous output torque exceeds the lower limit which is −9 Nm lower than the real zero point $\alpha$, a torque surpassing the allowable input range shown in FIG. 14 to the minus side is inputted so that there is a high possibility that no appropriate computation can be executed at the real zero point $\alpha$. Therefore, the (−) virtual zero point $\gamma$ is selected in step S205*a*. If the previous output torque exceeds its upper limit which is +9 Nm higher than the real zero point $\alpha$, a torque surpassing the allowable input range shown in FIG. 14 to the plus side is inputted and in this case, there is a high possibility that no appropriate computation can be executed at the real zero point $\alpha$. Thus, in step S205*c*, the (+) virtual zero point $\beta$ is selected.

In next step S207, a processing for correcting the zero point with the real zero point $\alpha$ selected in steps S205*a*–S205*c*, the (+) virtual zero point $\beta$ and the (−) virtual zero point $\gamma$ is carried out. That is, a processing for addition and subtraction of an offset value necessary for moving from the previously selected zero point to a currently selected zero point is carried out. Then, in step S209, the torque is computed as described previously and further, a steering angle (rotation angle) is computed in step S211. Because the zero point used for these computations is selected in steps S205a–S205c, for example, if a torque exceeding the range which can be computed with the real zero point α is inputted, the output torque can be computed with the (+) virtual zero point β or the (−) virtual zero point γ.

After the torque and steering angle are computed in steps S209, S211, a processing for computing an output torque and an output steering angle is carried out in subsequent step S213. That is, because the torque and steering angle computed in steps S209, S211 include offset values corresponding to the (+) virtual zero point β and the (−) virtual zero point γ, a computation for removing this offset value is executed in step S213. For a flat portion by a mechanical stopper within an expanded allowable input range shown in FIG. 9 or if the expanded allowable input range is surpassed, a processing in which no computation result is outputted is selectable. Consequently, the output torque value which cannot be computed appropriately even if the (+) virtual zero point β or the (−) virtual zero point γ is referred to is prevented from being outputted externally.

In subsequent step S215, a processing of memorizing the output torque value computed in the current processing into a memory unit is carried out. As described in step S203, this is executed for the necessity of reading out a previous output torque when executing this resolver signal computation processing of next time. After the processing of step S215 ends, the procedure waits for a next processing.

Next, other algorithm for the virtual zero point setting processing described with reference to FIG. 10 will be explained by referring to FIG. 12. Other example of the virtual zero point setting processing shown in FIG. 12(A) is for creating the (+) virtual zero point β and the (−) virtual zero point γ under conditions in which a specific torque is inputted from outside. On the other hand, in other example of the virtual zero point setting processing shown in FIG. 12(B), after the real zero point α is acquired, the electric angle θT1 of the first resolver 35 computed based on this is set to the (+) virtual zero point β or the (−) virtual zero point γ and then, in subsequent processings, this procedure is repeated and the (+) virtual zero point β and the (−) virtual zero point γ are updated at each processing time.

First, a flow chart shown in FIG. 12(A) will be described. As shown in FIG. 12(A), in step S121, a processing for acquiring an electric angle at the real zero point α is carried out like in step S101 of FIG. 10. As a result, the real zero point α is set up. Next, a processing for computing the (+) virtual zero point β and the (−) virtual zero point γ to the torque input (for example, +9 Nm, −9 Nm) inputted from outside and setting up is carried out in steps S123, S125. Then, a processing for memorizing the real zero point α, the (+) virtual zero point β and the (−) virtual zero point γ set up in this way into the memory unit is carried out in step S127.

Because in other algorithm example of the virtual zero point setting processing shown in FIG. 12(A), the (+) virtual zero point β and the (−) virtual zero point γ are set in the first resolver 35 and the second resolver 37 from the side of the torque input, an appropriate computation possible range expandable by the (+) virtual zero point α and the (−) virtual zero point β can be expanded to an maximum extent toward the upper limit or the lower limit by inputting a torque from outside through the steering wheel 21 or the like aiming at the vicinity of the upper limit or the lower limit of the allowable input range, which can be computed based on the real zero point α.

Next, other example of algorithm for the virtual zero point setting processing shown in FIG. 12(B) will be described. As shown in FIG. 12(B), in step S141, a processing for obtaining an electric angle at the real zero point α as described previously is carried out and the real zero point α is set up. Next, in step S143, for example, the resolver signal computation processing shown in FIG. 11 is carried out and then a processing for setting up the (+) virtual zero point β and the (−) virtual zero point γ based on a current input torque by the steering wheel 21 obtained consequently is carried out. Then, in step S145, a processing for memorizing the real zero point α, the (+) virtual zero point β and the (−) virtual zero point γ into the memory unit is carried out in step S145.

Because according to other algorithm for the virtual zero point setting processing shown in FIG. 12(B), the (+) virtual zero point β or the (−) virtual zero point γ is updated each time when the resolver signal arithmetic processing shown in FIG. 11 is carried out, the (+) virtual zero point β and the (−) virtual zero point γ can be set up depending on the situation of torque input by the steering wheel which changes with a passage of time. Therefore, an appropriate operation possible range, which is to be expanded by the (+) virtual zero point β and the (−) virtual zero point γ, can be expanded to be capable of following up changes in rotation input.

Figure 12:
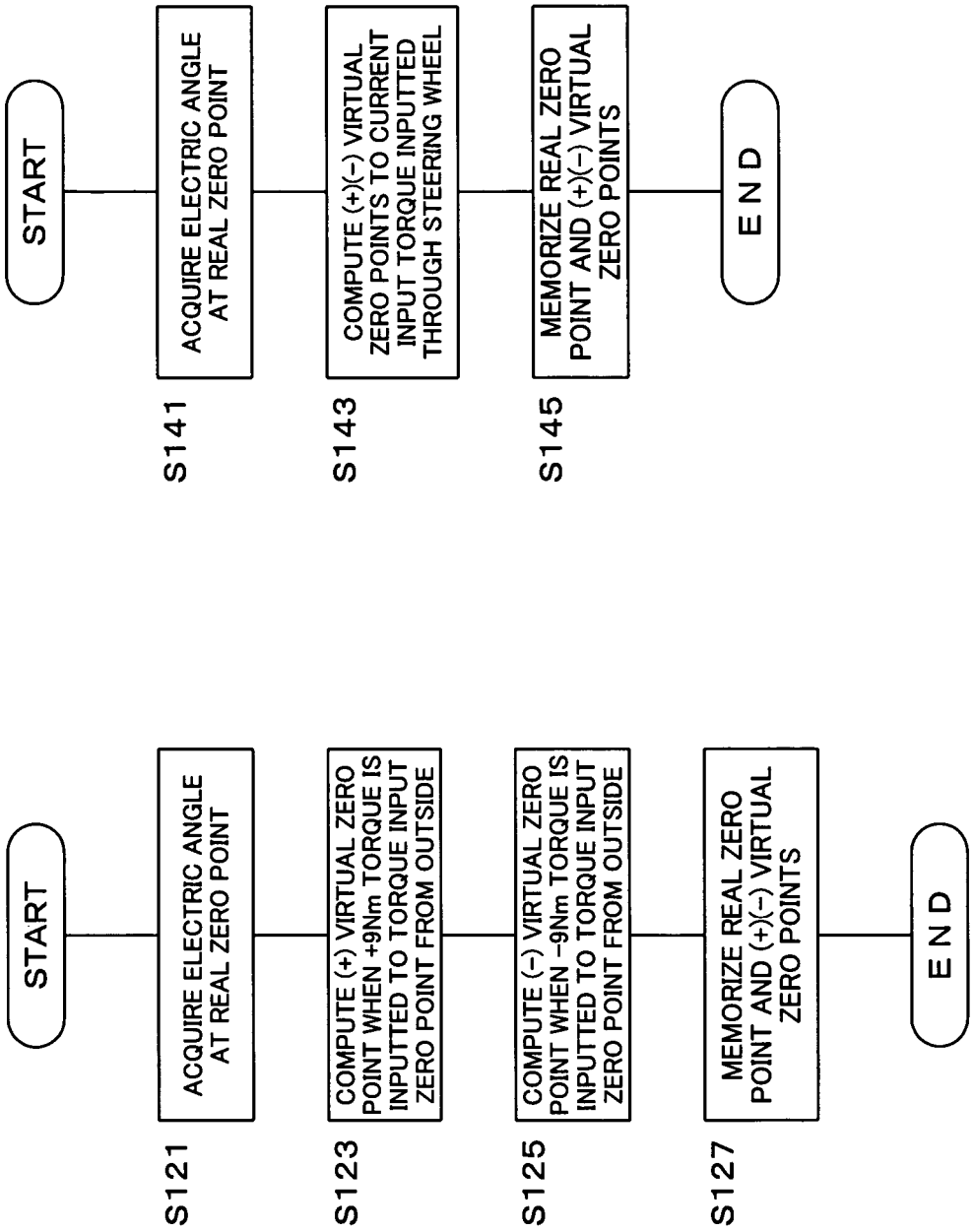
FIG. 12 is a flow chart showing other algorithm for the setting processing of the virtual zero point for use in the processing of the resolver signal of the embodiment.
Figure 13:
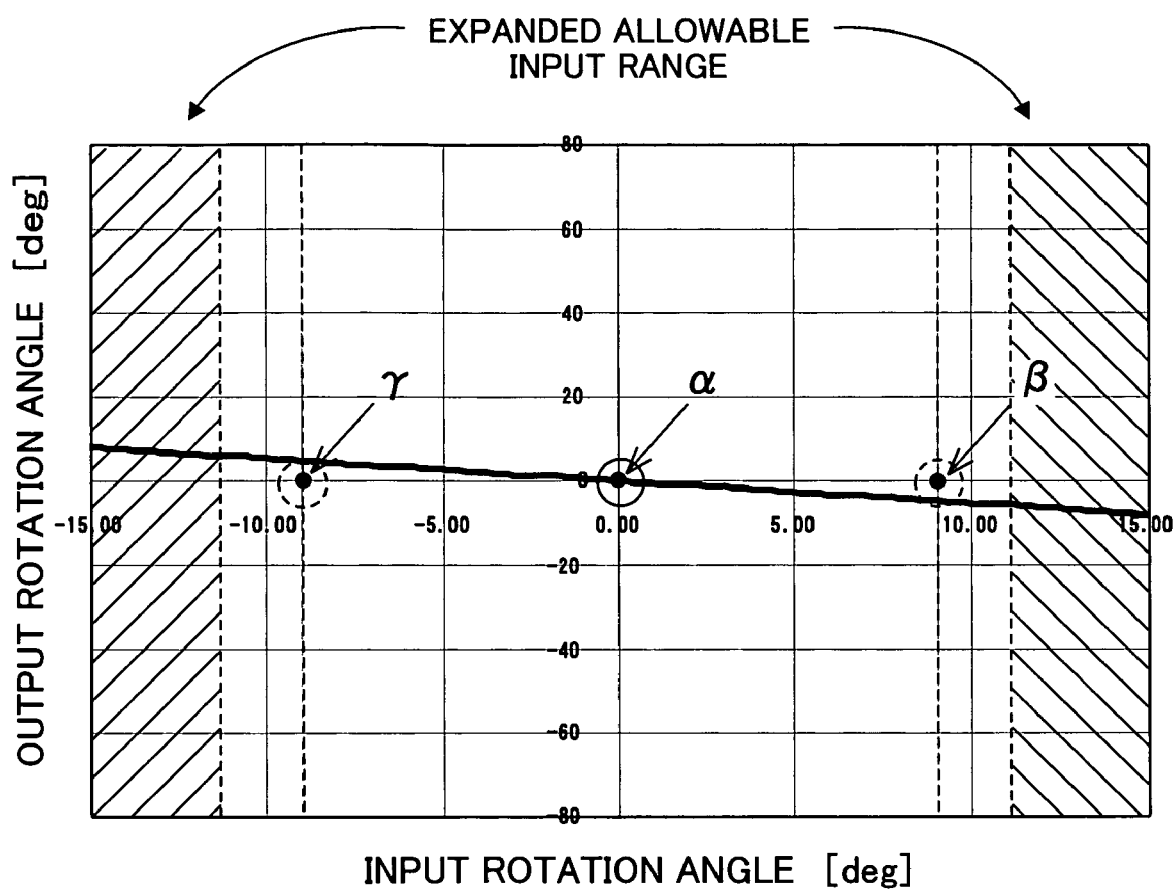
FIG. 13 is an explanatory diagram showing an example of the output rotation angle computed by the processing of the resolver signal of the embodiment.
Figure 15:
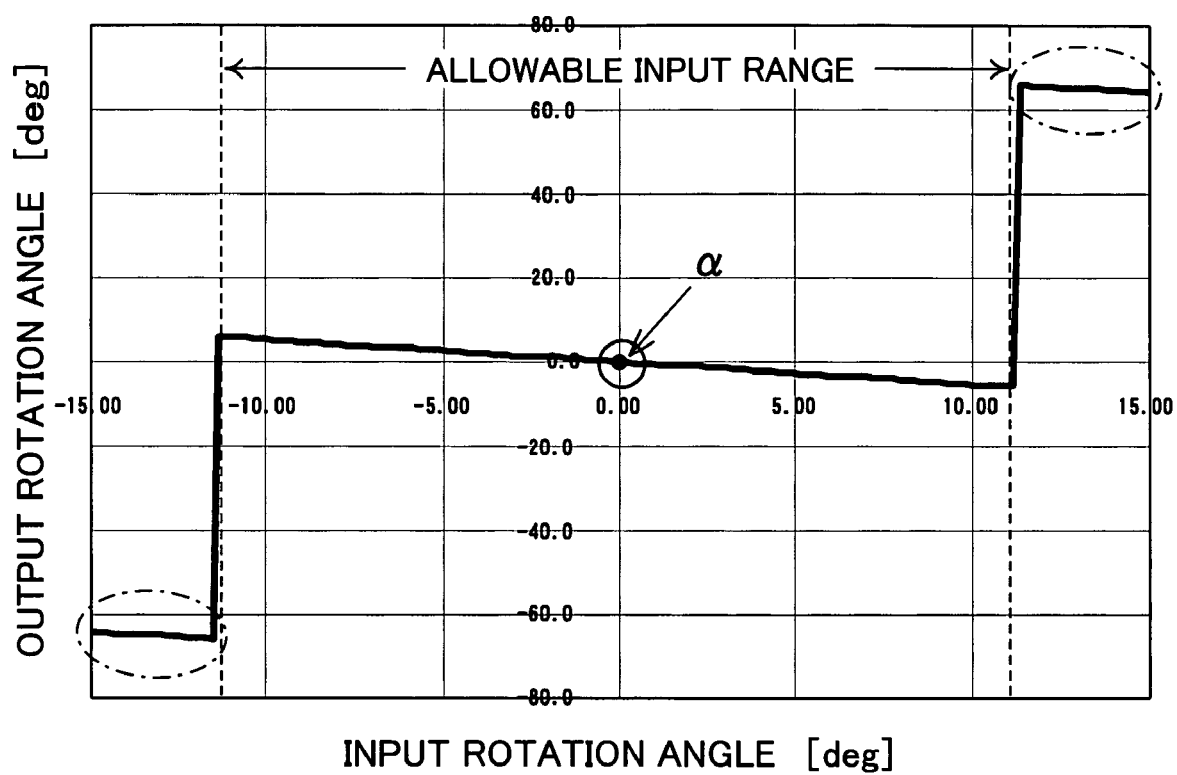
FIG. 15 is an explanatory diagram showing an example of an output rotation angle computed by the processing of a conventional resolver signal when a steering angle sensor is constituted of resolvers.

The virtual zero point setting processing and resolver signal arithmetic processing shown in FIGS. 10–12 can be applied in the same way if a steering angle of the steering wheel 21 is detected by the first resolver 35 and the second resolver 37 also as shown in FIG. 13. FIG. 13 indicates that the allowable input range has been expanded about its upper limit and lower limit as compared to a conventional arithmetic processing of the resolver signal shown in FIG. 15.

As described above, in the electrically-powered steering apparatus 20 of this embodiment, a steering torque and a steering angle within the allowable input range (within a predetermined range) are obtained of those inputted to the first resolver 35 and the second resolver 37 based on the real zero point α set up in step S201 (S205b, S207, S209, S211, S213) and then, a steering torque and a steering angle out of the allowable input range (out of the predetermined range) are obtained of those inputted to the first resolver 35 and the second resolver 37 based on (+) virtual zero point β and (−) virtual zero point γ set to a different value from the real zero point α (S205a, S205c, S207, S209, S222, S213). Consequently, a steering torque and a steering angle which cannot be obtained at the real zero point α and are out of the allowable input range can be obtained of those inputted to the first resolver 35 and the second resolver 37, based on the (+) virtual zero point β and (−) virtual zero point γ. Thus, an appropriate operation possible range can be expanded and by appropriate expansion of the operation possible range, the necessity of controlling the installation accuracies of the first resolver 35, the second resolver 37 and mechanical components constituting the surroundings strictly is eliminated. As a result, the installation accuracy can be relaxed and further, installation cost can be reduced.

Although the above embodiment has been described about a case where two resolvers (first resolver 35 and second resolver 37) are provided, the present invention can be applied to arithmetic processing on resolver signals outputted from two or more resolvers. Further, the (+) virtual zero point β and the (−) virtual zero point γ are not restricted to two points and by setting up these points at plural positions, for example, three positions or four positions, the allowable input range can be expanded to a wider range.

As other embodiment of the above-described electrically-powered steering apparatus 20, modifications which have resolved the following problems will be described with reference to FIGS. 16–20. In the electrically-powered steering apparatus 20 described with reference to FIGS. 1–15, by setting up the (+) virtual zero point β and the (−) virtual zero point γ picking up a different value from the real zero point α, a steering torque and a steering angle which cannot be obtained at the real zero point α and is out of the allowable input range can be obtained based on the (+) virtual zero point β and the (−) virtual zero point γ (the allowable input range expanded as shown in FIG. 9).

Just after the electrically-powered steering apparatus 20 is started, for example, a ignition switch (hereinafter referred to as IG) of a vehicle loaded with the electrically-powered steering apparatus 20 is turned ON, usually, a processing for initializing a semiconductor memory unit of the CPU 61 which constitutes the ECU 60 (zero clear) is carried out. Thus, even if the resolver signal arithmetic processing shown in FIG. 11 reads out an output torque computed last and memorized by the resolver signal arithmetic processing and then, intends to execute a processing for determining in which range the last outputted torque exists (below −9 Nm, less than −9 Nm, more than +9 Nm), no last arithmetic processing is memorized in the semiconductor memory unit just after the initialization. Thus, unless a selection processing of the zero point is carried out appropriately in step S203, there is such a problem that an operation error may occur in step S209, S211 and the like.

According to the algorithm of the resolver signal arithmetic processing shown in FIG. 11, by selecting zero points α, β, γ which act as a reference for torque arithmetic operation based on last output torque (last torque value inputted to the torque sensor 30) memorized in the semiconductor memory unit, arithmetic processing on a torque and a steering angle inputted to the torque sensor 30 is enabled (S203–S211 shown in FIG. 11). Thus, in case of zero clear in which the memory content of the semiconductor memory unit is reset to zero by an initialization just after the ECU 60 is powered ON (IG ON), there is a possibility that the zero point selection processing in step S203 may be mistaken. Even if an output torque just before the IG off is memorized in the nonvolatile semiconductor memory unit or the like, which is out of objective of the initialization, when an output torque just before IG off, memorized converts to other value due to a fault in the nonvolatile semiconductor memory unit or the like, there is a possibility that the zero point selection processing in step S203 may be mistaken. Then, if torque arithmetic operation in step S209 and steering angle arithmetic operation in step S211 are carried out based on such an inappropriate zero point, there is a possibility that an arithmetic operation may result in an error.

If the last output torque is set to zero by an initialization just after the ECU 60 is powered ON, the real zero point α is always selected in step S203 (S205b), however, in this case, an output torque is computed according to the characteristic shown in FIG. 14. That is, if the real zero point α is selected, no arithmetic operation based on the virtual zero points β, γ is carried out (S207–S211). Thus, although a rare case, if the steering wheel is steered by a vehicle driver or other person and the IG ON occurs with a torque input maintained, it comes that the resolver signal arithmetic processing shown in FIG. 11 is executed under conditions in which a torque is inputted to the torque sensor 30 just after the ECU 60 is powered ON. Thus, even if the input torque is a value exceeding the allowable input range shown in FIG. 14, arithmetic processing is executed based on not the virtual zero points β, γ but the real zero point α. As a result, there is a possibility of inducing such an operation error that although an actual input torque is +11 Nm, its operation result is computed as −11 Nm or although the actual input torque is −11 Nm, the operation result is computed as +11 Nm.

Figure 16:
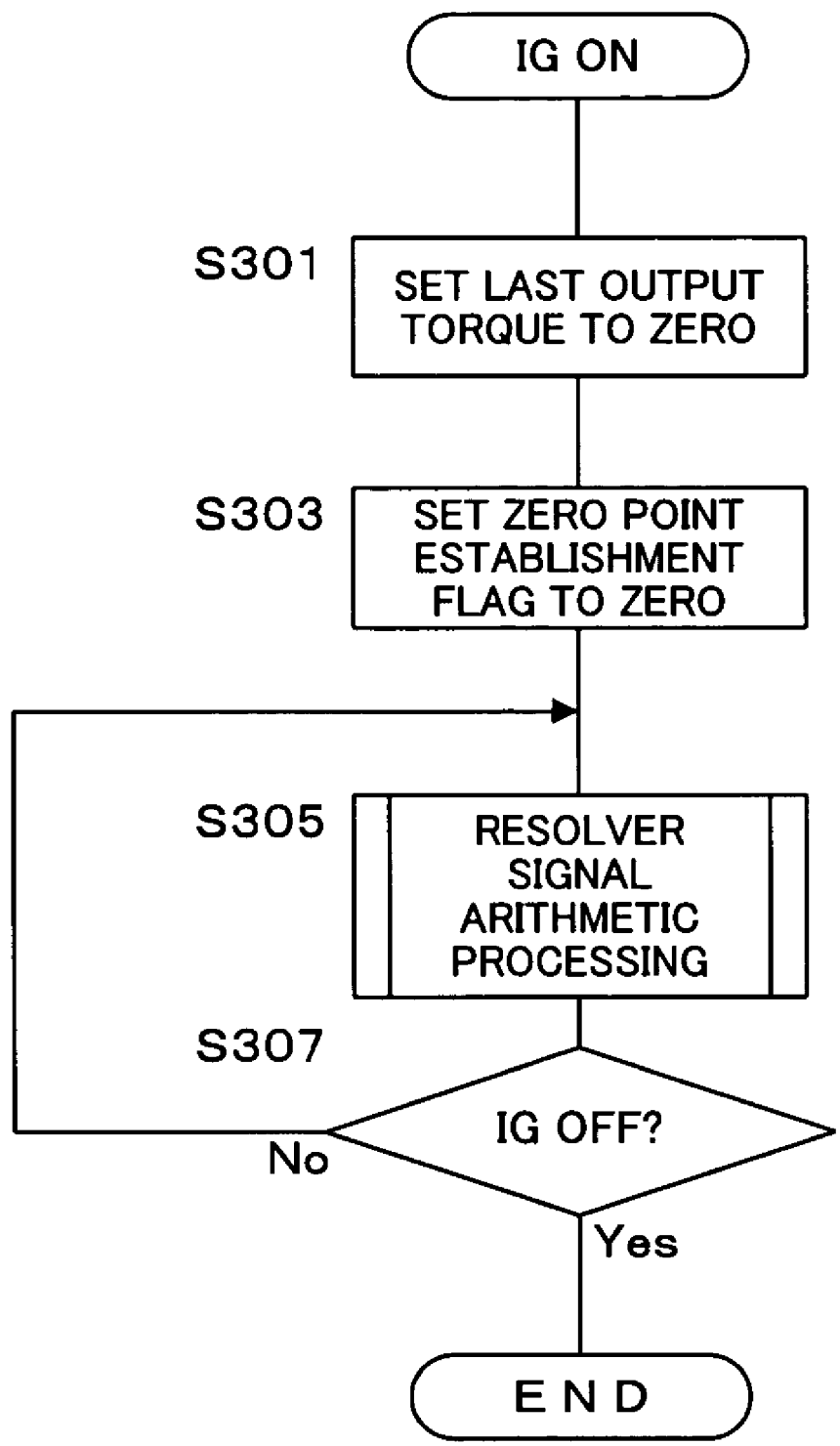
FIG. 16 is a flow chart showing a flow of the processing according to a first modification of the embodiment.
Figure 17:
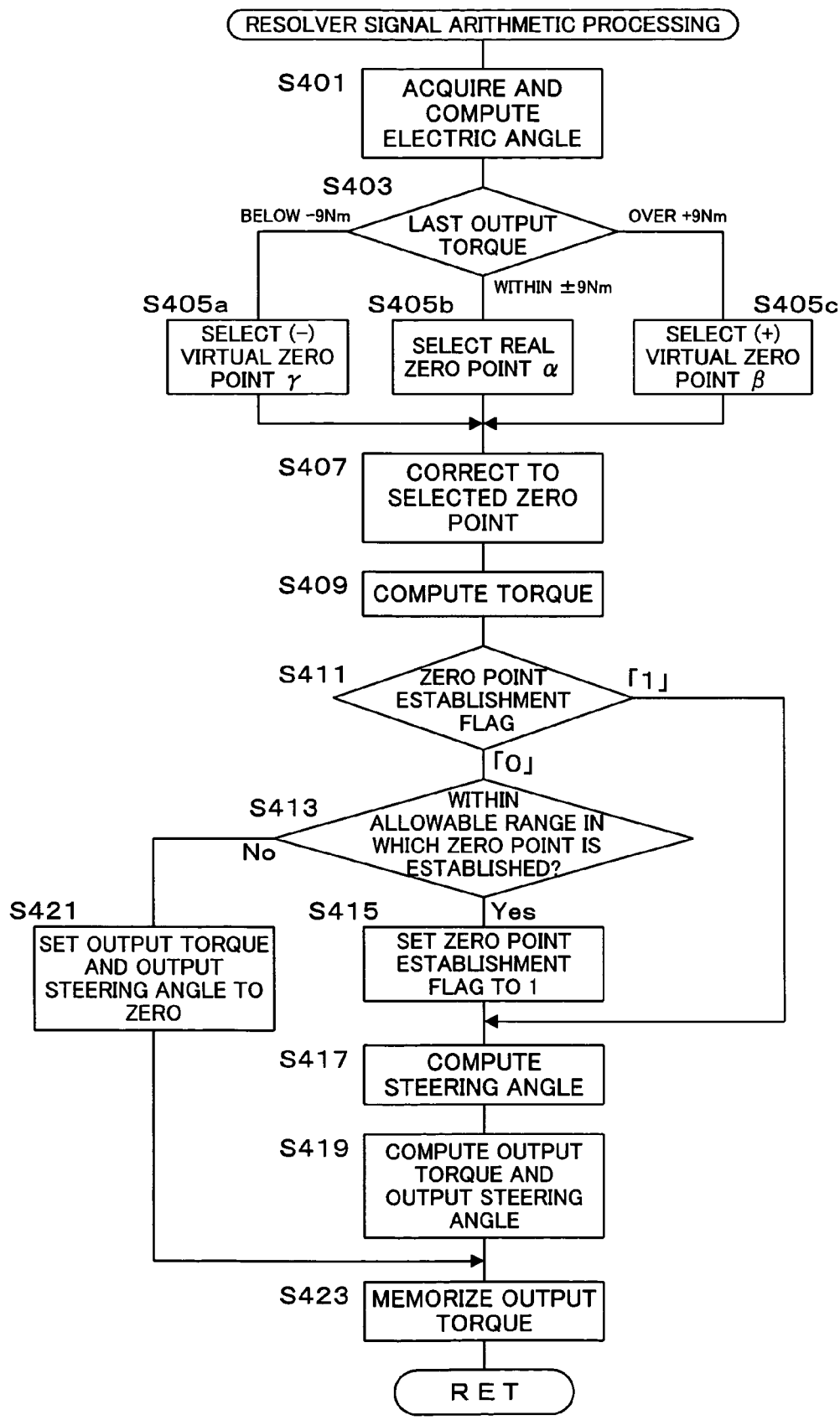
FIG. 17 is a flow chart showing a flow of resolver signal processing shown in FIG. 17.
Figure 19:
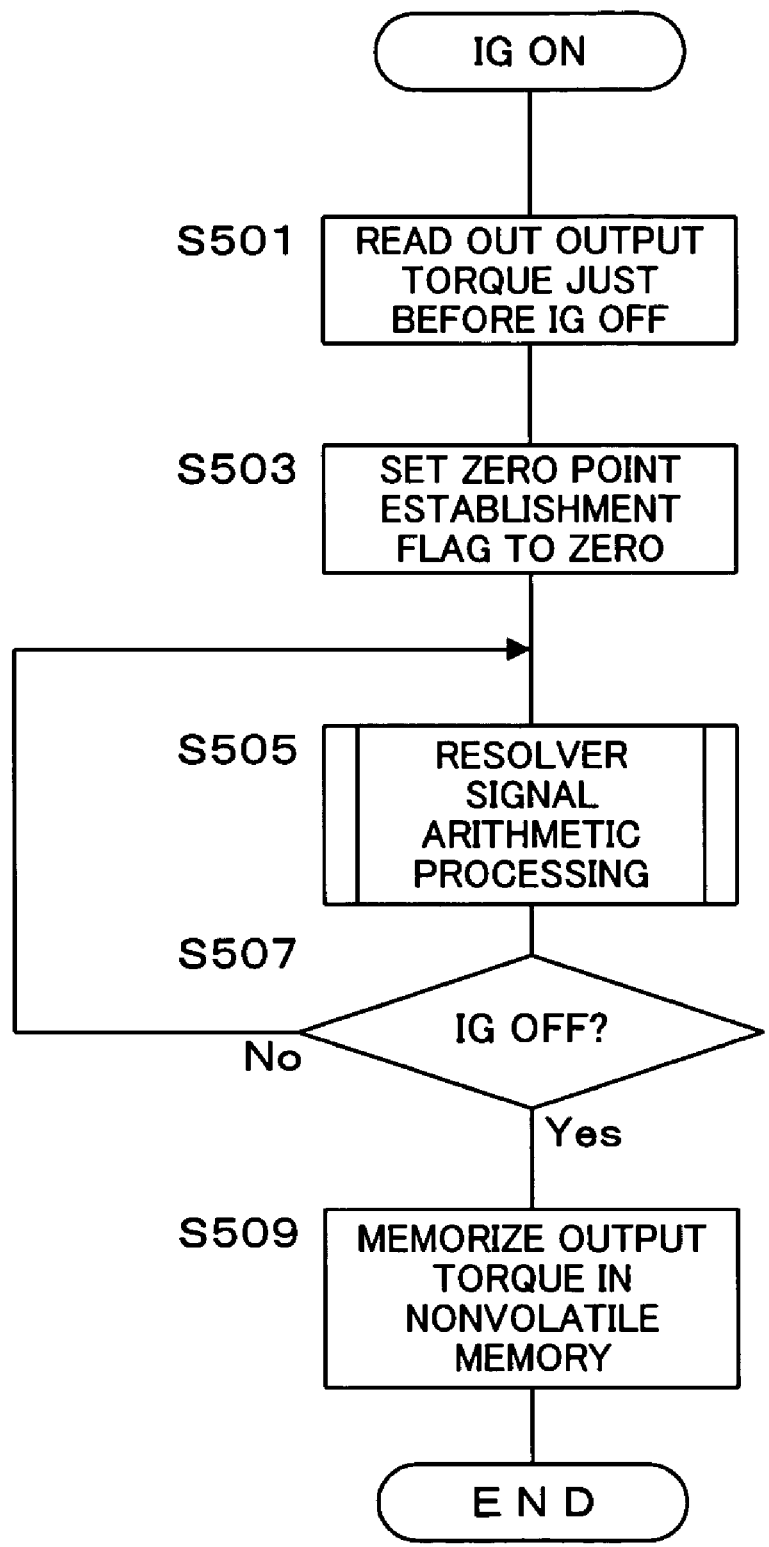
FIG. 19 is a flow chart showing the flow of the processing according to a second modification of the embodiment.
Figure 20:
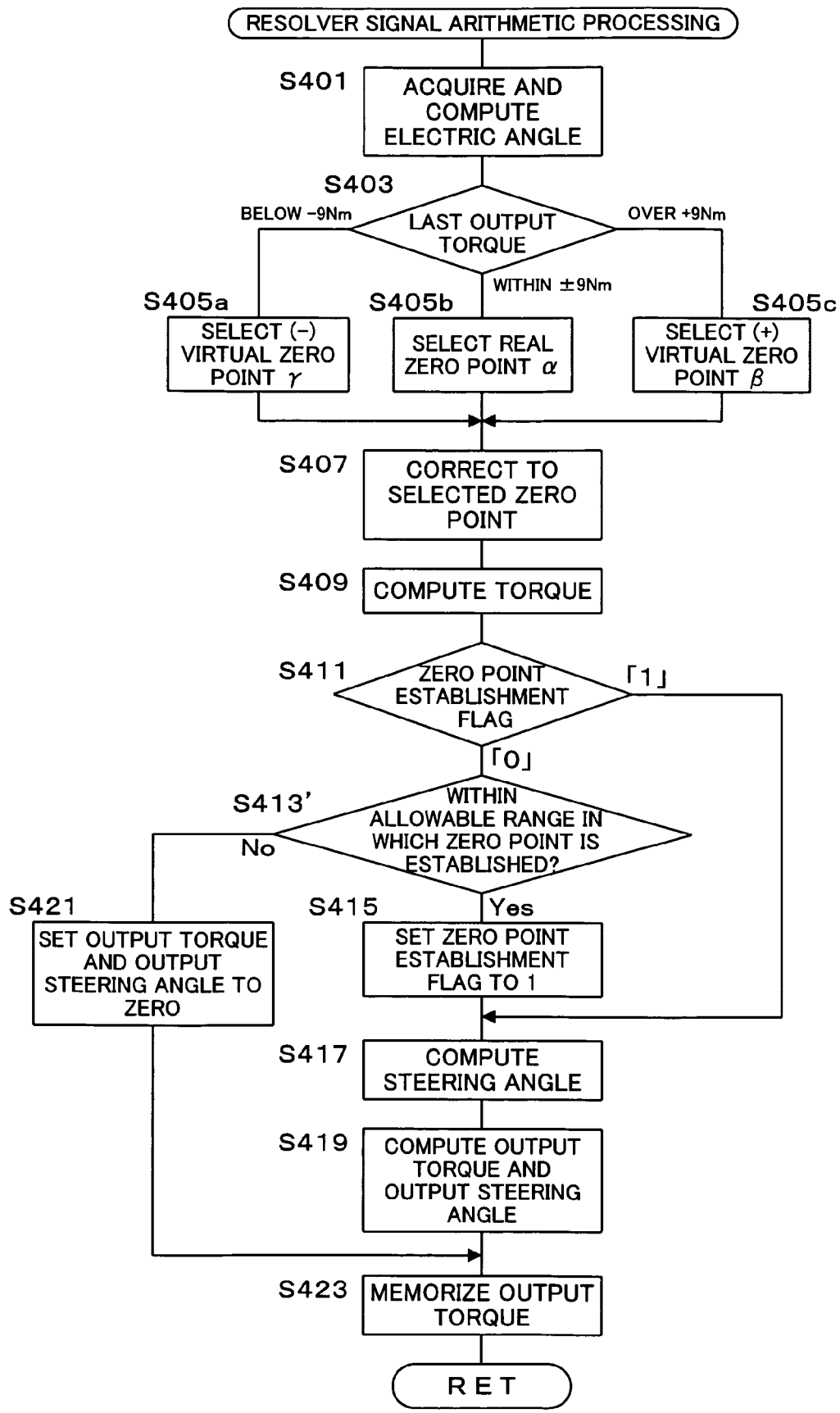
FIG. 20 is a flow chart showing a flow of the resolver signal processing shown in FIG. 19.

Then, according to this modification, by adopting the algorithm shown in FIGS. 16, 17 (first modification) or in FIGS. 19, 20 (second modification) for the arithmetic processing by the CPU 61 of the ECU 60, the above-described problem is solved. In the meantime, the hardware which constitutes the electrically-powered steering apparatus of this modification is the same as that of the electrically-powered steering apparatus 20 described above and respective processings of the first and second modifications are carried out by the CPU 61 which constitutes the ECU 60 of the electrically-powered steering apparatus 20.

First Modification

Figure 18:
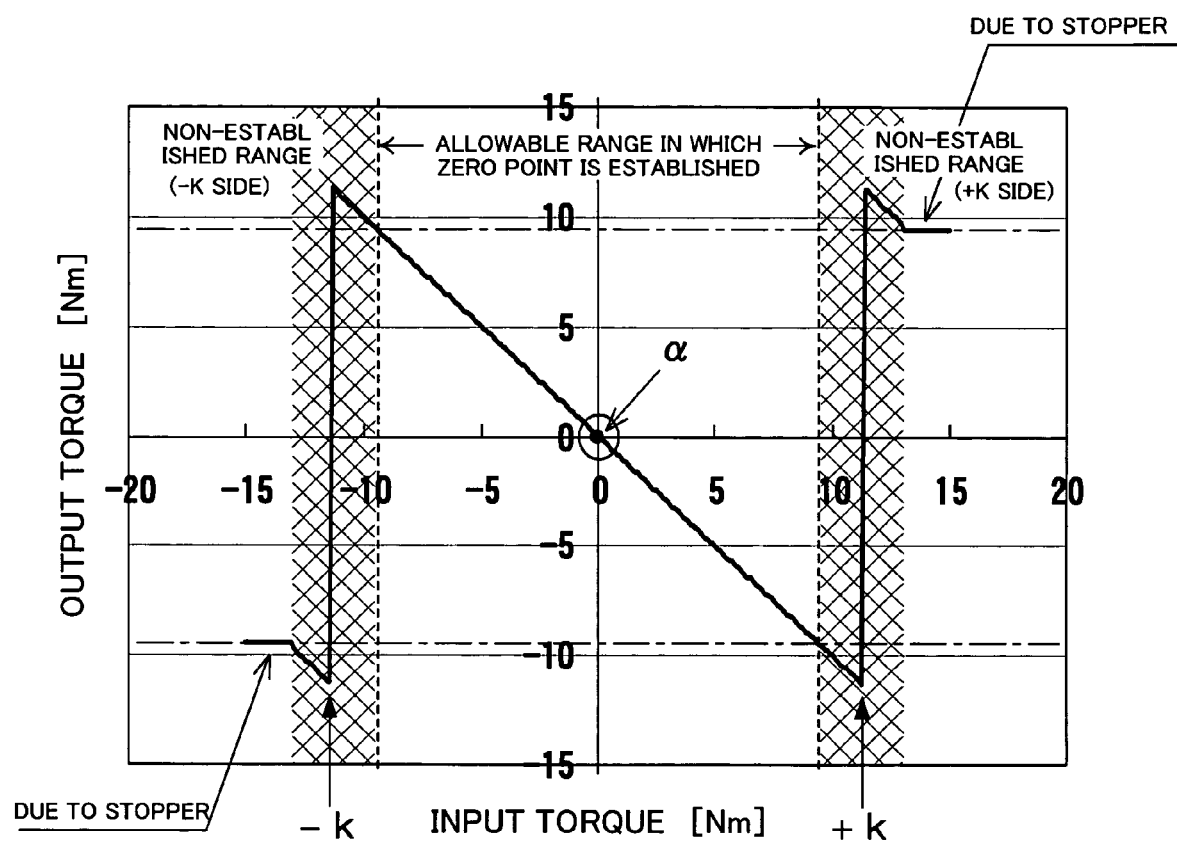
FIG. 18 is an explanatory diagram showing an example of the characteristic of the output torque computed according to a real zero point $\alpha$.

According to the first modification, the arithmetic processing by the CPU 61 is carried out by the processing shown in FIG. 16 for starting the electrically-powered steering apparatus of the first modification by IG ON of a vehicle loaded with the electrically-powered steering apparatus and the resolver signal arithmetic processing shown in FIG. 17 which is called by the aforementioned processing. In the meantime, FIG. 18 shows an example of the characteristic of the output torque computed based on the real zero point α.

According to the first modification, as shown in FIG. 16, when the IG is turned ON, a processing for setting the last output torque to zero is carried out in step S301. That is, because usually a processing for initializing the semiconductor memory unit of the CPU 61 is carried out just after the IG of a vehicle is turned ON, the last output torque value is set to zero accompanied by this.

In next step S303, a processing for setting the zero point establishment flag to zero is carried out. This zero point establishment flag indicates whether or not a selected zero point is established as appropriate in resolver signal arithmetic processing which will be described later (FIG. 17; S403). If "1" is set for that value, it is indicated that the zero point is established and if "0" is set up, it is indicated that the zero point is not established. Because that zero point is not established just after the IG is turned ON, for the reason described later, "0" is set on the zero point establishment flag.

In subsequent step S305, the resolver signal arithmetic processing is carried out. The detail of this resolver signal arithmetic processing will be described with reference to FIG. 17. The resolver signal arithmetic processing of step S305 is executed repeatedly until the IG is turned off (No in S307).

The resolver signal arithmetic processing of the first modification is composed of steps S401–S423 as shown in FIG. 17. This resolver signal arithmetic processing is obtained by modifying the resolver signal arithmetic processing described with FIG. 11 partly and steps S401–S409 may correspond to the steps S201–S209 in FIG. 11. For the reason, the detailed description of the steps S401–S409 is omitted and mainly a flow of processing just after the IG is turned ON will be explained.

First in step S401, a processing for acquiring and computing the electric angle θT1 of the first resolver 35 and the electric angle θT2 of the second resolver 37 is carried out. Because just after the IG is turned ON, the steering wheel 21 can be steered by a vehicle driver so that any torque is inputted although this is a rare case, the electric angles θT1, θT2 are generated in the first resolver 35 and the second resolver 37 in this case.

Next, in step S403, a processing for reading out a last output torque form the semiconductor memory unit and determining in which range the last torque exists is carried out. Because just after the IG is turned ON, the last output torque is set up in the aforementioned step S301, the last output torque read out there turns to zero. Thus, in this step S403, the procedure proceeds to step S405b which is selected when the input torque is less than ±9 Nm and a processing for selecting the real zero point α is carried out. Then, a processing for correcting the zero point is carried out with the real zero point α selected in this step S405b (same as S207 shown in FIG. 11). Further, a processing for computing the torque is carried out in step S409 (same as S209 shown in FIG. 11).

After a torque value is computed in step S409, branch processing is carried out based on the setting condition of a zero point establishment flag in subsequent step S411. That is, because if the aforementioned zero point establishment flag is set to "0", the zero point selected by steps S405a, S405b, S405c has not been established yet and thus, the procedure proceeds to subsequent step S413. On the other hand, because if the zero point establishment flag is set to "1", the zero point has been established, the procedure proceeds to step S417, in which the same processing as the resolver signal arithmetic processing shown in FIG. 11 is carried out (S417, S419, S423 correspond to S211, S213, S215 respectively). Because just after the IG is turned ON, "0" is set on the zero point establishment flag as described above, a processing for determining whether or not that torque value exists within a range capable of establishing the zero point is carried out based on a torque computed in step S409 in subsequent step S413.

Because the torque value computed based on the real zero point α has the characteristic shown in FIG. 18, a range in which the zero point cannot be established (hereinafter called "non-established range) is generated around the boundary (portion (+k, −k) in which the output torque changes from positive to negative or from negative to positive quickly to a minute change of the input torque) of the allowable input range shown in FIG. 14 (a cross-hatched range shown in FIG. 18). Although if a torque within such a non-established range (below −9 Nm or over +9 Nm in FIG. 18) is inputted to the first resolver 35 or the second resolver 37, originally, the (+) virtual zero point β or the (−) virtual zero point γ should be selected as a zero point in step S403 and computed in terms of torque, in step S409, the torque computation is carried out based on the real zero point α selected in step S405b because the last output torque is set to zero just after the IG is turned ON. Thus, the result of an arithmetic operation based on the real zero point α which is carried out when the input torque exists within such a non-established range becomes an abnormal value. Thus, such a real zero point α cannot be established as an appropriate zero point. On the other hand, the result of an arithmetic operation based on the real zero point α which is carried out when the input torque exists out of that non-established range, that is, within a range sandwiched by a non-established range on the +k side and a non-established range on the −k side (hereinafter referred to as zero point establishment possible range) becomes a normal value and therefore, that real zero point α can be established as an appropriate zero point.

Thus, in step S413, by determining whether or not the input torque exists within the range in which the zero point can be established, whether or not the real zero point α selected in steps S403, S405b can be established as an appropriate zero point is determined. For example, because according to the characteristic example shown in FIG. 18, if the input torque is less than ±9 Nm (zero point establishment possible range), the real zero point α is selected as an appropriate zero point, the procedure proceeds to subsequent step S415 in which a processing for setting the zero point establishment flag to "1" is carried out. On the other hand, if the input torque is below −9 Nm (non-established range on −k side) or over +9 Nm (non-established range on +k side), the selected real zero point α is not an appropriate zero point, the procedure proceeds to step S421, in which a processing for setting the output torque and output steering angle to zero is carried out.

This non-established range is determined by a restriction position of a stopper mechanism for restricting the range of a difference in input angle (for example, ±6°) of both the resolvers by limiting the twisting amount of the torsion bar 31 connected to the first resolver 35 and the second resolver 37 within a predetermined range. For example, in case of the characteristic example shown in FIG. 18, a range (cross-hatched range) in which the characteristic line extending from the boundary (+k) outward (direction of increasing the input torque) up to a flat characteristic by the stopper is folded back to the inside (direction of decreasing the input torque) with respect to the boundary (+k) is a non-established range on the +k side. Likewise, a range (cross-hatched range) in which the characteristic line extending from the boundary (−k) outward (direction of decreasing the input torque) up to a flat characteristic by the stopper is folded back to the inside (direction of increasing the input torque) with respect to the boundary (−k) is a non-established range on the −k side.

The above-described processing in step S413 and step S421 may correspond to "the third step" and "the zero point establishment possible range" may correspond to "a predetermined specific value range".

Because if the zero point establishment flag is set to 1 in step S415, the arithmetic processing based on the real zero point α is carried out properly, a steering angle is computed in subsequent step S417 and then, an output torque and an output steering angle are computed in step S419. These processings are carried out like steps S211, S213 described with reference to FIG. 11. Because if the real zero point α is selected as the zero point, no offset value is contained in the arithmetic operation result different from a case where the (+) virtual zero point β and the (−) virtual zero point γ are selected, a processing for subtracting a dummy (value zero) offset value is carried out in step S419.

On the other hand, because if the output torque and output steering angle are set to zero in step S421, the probability that an operation error may exist without normal arithmetic operation based on the real zero point α is high, the output torque for clearing such an abnormal value is set up. Further, the output steering angle is set to zero too without the arithmetic operation about the steering angle in step S419.

In step S423, a processing for memorizing the output torque value set by arithmetic operation in step S419 or by step S421 into a semiconductor memory unit is carried out. Consequently, a last output torque to be read out when a next resolver signal arithmetic processing is executed is memorized. After the processing by step S423 ends, whether or not the IG is turned OFF is detected by step S307 in FIG. 16 and if the IG is off (Yes in S307), the processing is terminated. On the other hand, unless the IG is off (No in S307), the procedure proceeds to step S305 again in which the resolver signal arithmetic processing is carried out.

According to the first modification, at the initialization of the electrically-powered steering apparatus having the torque sensor 30 comprising the first resolver 35 and the second resolver 37, the content of the semiconductor memory unit in the CPU 61 is zero cleared and if it is determined that the torque obtained in steps S405b, S407, S409 is not within the zero point establishment possible range (within a predetermined specific range) specified by the allowable input range (predetermined range) by step S413, that torque is set to zero by step S421. Consequently, because any torque out of the zero point establishment possible range is set to zero, even if the torque obtained by steps S405b, S407, S409 just after the initialization processing is an abnormal value, its disadvantage can be corrected. Thus, even if the initialization processing for zero clearing the content of the semiconductor memory unit is carried out, an appropriate arithmetic operation possible range can be expanded by an arithmetic processing method of the resolver signal applied to the aforementioned electrically-powered steering apparatus 20 in order to prevent a computation of an abnormal value due to an operation error just after that initialization processing.

Second Modification

In the first modification, the arithmetic operation error which can occur in case of zero clear in which the memory content of the semiconductor memory unit is set to zero by the initialization just after the ECU 60 is powered ON has been solved. An object of the second modification is to solve the arithmetic operation error which can occur when the output torque just before the IG is turned off memorized in the nonvolatile semiconductor memory unit converts to unreadable irregular form. The output torque just before the IG is turned off may correspond to the data value concerning the newest rotation.

According to the second modification, substantially like the first modification, the arithmetic processing of the CPU 61 is carried out by the processing shown in FIG. 19 for starting the electrically-powered steering apparatus of the second modification by the IG ON of a vehicle loaded with this electrically-powered steering apparatus and the resolver signal arithmetic processing called by this processing and shown in FIG. 20. The electrically-powered steering apparatus of the second modification includes a nonvolatile semiconductor memory unit (for example, EEP ROM) which is not zero-cleared by the initialization just after the ECU 60 is turned on as a presumption.

According to the second modification, as shown in FIG. 19, when the IG of a vehicle is turned on, a processing for reading out an output torque just before the IG is turned off is carried out in step S501. As described later, the output torque value obtained by resolver signal arithmetic processing (S505) just before the IG is turned off is memorized in the nonvolatile semiconductor memory unit (S509). For the reason, according to the second modification, the output torque just before the IG is turned off can be read out from the nonvolatile semiconductor memory unit. However, by estimating a case where the read-out output torque just before the IG is turned off changes to irregular form, for example, a case where although the IG is turned off last with no torque inputted to the steering wheel 21 (output torque is 0 Nm), a torque of 9.5 Nm is inputted through the steering wheel 21 as an output torque just before the IG is turned off, a flow of the following processing will be explained.

In next step S503, a processing for setting the zero point establishment flag to zero is carried out. This zero point establishment flag indicates whether or not the zero point selected by the resolver signal arithmetic processing (FIG. 20; S403) is established as an appropriate one like the first modification. Because just after the IG is turned on, the zero point is not established like the first modification, "0" is set on the zero point establishment flag.

In subsequent step S505, the resolver signal arithmetic processing is carried out. The detail of the resolver signal arithmetic processing will be described with reference to FIG. 20. The resolver signal arithmetic processing in step S505 is executed repeatedly until the IG is turned off (No in S507) and after the IG is turned off, the output torque value obtained by the resolver signal arithmetic processing is memorized in the nonvolatile semiconductor memory unit in step S509.

As shown in FIG. 20, the resolver signal arithmetic processing of the second modification is constructed substantially in the same way as the resolver signal arithmetic processing of the first modification described with reference to FIG. 17 and determination processing in step S413 is different from the first modification. Therefore, here, detailed description of processing except in step S413 of steps S401–S423 is omitted and for these steps, mainly a flow of processing for a case where the output torque just before the IG is turned off, read out in step S501 changes to irregular form will be explained.

First in step S401, a processing for acquiring the electric angle $\theta$ T1 of the first resolver 35 and the electric angle $\theta$ T2 of the second resolver 37 and computing is carried out. Although just after the IG is turned on, the steering wheel is steered by a vehicle driver so that any torque is inputted although this is a rare case, it is assumed here that any torque is not inputted through the steering wheel 21 (0 Nm).

Next in step S403, a processing for reading out a last output torque from the semiconductor memory unit and determining in which range a last torque exists is carried out. Because just after the IG is turned on, the output torque just before the IG is turned off is readout from the nonvolatile semiconductor memory unit in step S501, the zero point is selected based on that torque value.

That is, just after the IG is turned on, whether the read-out output torque just before the IG is turned off is below the (−) virtual zero point $\gamma$ (−9 Nm) by the virtual zero point setting processing described with reference to FIG. 10, over the (+) virtual zero point $\gamma$ (+9 Nm) or within a range of ±9 Nm around the real zero point $\alpha$ is determined. Because it is assumed that the output torque just before the IG is turned off is read out as +9.5 Nm in a converted irregular form although it should originally be 0 Nm, in this step S403, the procedure proceeds to step S405c which is selected if it is over +9 Nm, in which a processing for selecting the (+) virtual zero point $\beta$ is carried out. In the meantime, the (+) virtual zero point $\beta$ is set to +9 Nm as described previously (FIG. 10; S103).

In subsequent step S407, a processing for correcting the zero point with the selected (+) virtual zero point $\beta$ is carried out (same as S207 in FIG. 11) and in step S409, a processing for computing an input torque based on this (+) virtual zero point $\beta$ is carried out (same as S209 in FIG. 11). Because the (+) virtual zero point $\beta$ is set to +9 Nm, no torque is inputted through the steering wheel 21 and if the torque input just after the IG is turned on is 0 Nm, the torque value is computed as −9 Nm with respect to the (+) virtual zero point $\beta$ (+9 Nm), that is, as if the steering wheel is steered by 9 Nm to the left direction.

After a torque value is computed in step S409, branch processing is carried out based on the setting condition of the zero point establishment flag in step S411. Here, "0" is set on the zero point establishment flag as described above, because this is just after the IG is turned on. Thus, the procedure proceeds to subsequent step S413', in which a processing for determining whether that torque value exists within a range capable of establishing the zero point is carried out based on a torque computed in step S409.

In this step S413', whether or not any input torque exists within the zero point establishment possible range is determined based on a specified determination equation unlike the first modification. The specified determination equation is, for example, "lower limit for determination <(torque value obtained in step S409—last output torque)<upper limit for determination. Here, based on the non-established range described with reference to FIG. 18, it is set up that the lower limit is −9 Nm and the upper limit is +9 Nm. On the other hand, because the torque value obtained by step S409 is −9 Nm and the output torque just before the IG is turned off, corresponding to the last output torque is read out as 9.5 Nm, the result of computation based on that determination equation is (−9−9.5) Nm=−18.5 Nm.

Therefore, because −18.5 Nm is largely below the lower limit of −9 Nm, the determination condition is not satisfied (No in S413') and then, the processing proceeds to step S421. In step S412, a processing for setting the output torque and output steering angle to zero is carried out like the first modification.

The processing in step S413' and step S421 may correspond to the fourth step and "torque value—last output torque obtained in step S409" may correspond to "a difference between data value relating to a rotation obtained from a first step or a second step and data value relating to the newest rotation". The "zero point establishment possible range" may correspond to the "specified value range".

Because if the "output torque just before the IG is turned off", memorized in the nonvolatile semiconductor memory unit does not change to any irregular form, the output torque just before the IG is turned off is read out as 0 Nm in step S501 and the real zero point α is selected in step S403. Thus, a torque value obtained in step S409 is 0 Nm. Thus, because the result of computation according to that determination equation is (0-0) Nm =0 Nm, the determination condition is satisfied (Yes in S413') and the processing proceeds to step S415, in which the zero point establishment flag is set to 1.

Because if the zero point establishment flag is set to 1 in step S415, the arithmetic processing based on the real zero point α is carried out properly, a steering angle is computed in subsequent step S417 and then, a processing for computing an output torque and an output steering angle is carried out in step S419. On the other hand, because if the output torque and output steering angle are set to zero in step S421 (in case where based on the (+) virtual zero point β), the probability that an arithmetic operation error exists is high, the output torque is set to zero for clearing an abnormal value and the output steering angle is set to zero.

In step S423, a processing for memorizing an output torque value set by arithmetic operation in step S419 or by step S421 into the semiconductor memory unit is carried out. Consequently, the last output torque to be read out when next resolver signal arithmetic processing is carried out is memorized. After the processing by step S423 ends, whether or not the IG is turned off is detected by step S507 in FIG. 19 and if the IG is turned off (Yes in S507), a processing for memorizing the output torque value into the nonvolatile semiconductor memory unit is carried out in step S509 and the processing ends. On the other hand, unless the IG is turned off (No in S507), the processing proceeds to step S505, in which the resolver signal arithmetic processing is carried out.

According to the second modification, if in step S413', it is determined that when initializing the electrically-powered steering apparatus having the torque sensor 30 comprising the first resolver 35 and the second resolver 37, a difference between the torque obtained in steps S405a, S405b, S405c, S407, S409 and the output torque just before IG off read out from the nonvolatile semiconductor memory unit does not exist within the zero point establishment possible range (specified value range), that torque is set to zero in step S421. Consequently, because a torque departing from the zero point establishment possible range is set to zero, even if the output torque just before IG off read out from the nonvolatile semiconductor memory unit is changed to irregular form, that fault can be corrected. Thus, an appropriate computation possible range can be expanded according to the arithmetic processing method for the resolver signal applied to the above-described electrically-powered steering apparatus in order to prevent a computation of an abnormal value due to arithmetic operation error based on that data change into irregular form.

Although in the above described embodiment, and the first and second modifications, the electrically-powered steering apparatus has been exemplified as an application object of the present invention, the application object of the present invention is not restricted to the electrically-powered steering apparatus. As long as information about rotations inputted to an end of a torsion bar, whose other end is fixed, is acquired by computation based on a resolver signal outputted from plural resolvers attached to both ends of the torsion bar, the present invention can be applied to, for example, machine tools and the like and then, the same operation and effect as described above can be obtained.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A resolver signal processing method for resolver signal for obtaining information about a rotation inputted to an end of a torsion bar whose other end is fixed, by computation based on a resolver signal outputted from plural resolvers attached to both ends of the torsion bar, said resolver signal processing method comprising:
   a first step for obtaining a first data value within a predetermined range of data values relating to rotations inputted to said plural resolvers based on a data value relating to said rotation obtained from a known rotation input serving as a reference set as a first reference value;
   a second step for obtaining a second data value out of the predetermined range of said inputted data values relating to the rotations based on a second reference value set to a different value from said first reference; and
   a third step for obtaining information about a rotation inputted to an end of the torsion bar whose other end is fixed using said first data value and said second data value.

2. The resolver signal processing method according to claim 1 wherein said second reference values are set in the quantity of one or more each for a value higher than said first reference value and a value smaller than said first reference value.

3. The resolver signal processing method according to claim 1 wherein said second reference value is set to data value relating to said rotation offset by a predetermined value with respect to said first reference value.

4. The resolver signal processing method according to claim 1 wherein said second reference value is a rotation input offset by only a predetermined angle with respect to a known rotation input serving as said reference and set to data value relating to said rotation obtained from the data values possible to compute in said first step.

5. The resolver signal processing method according to claim 1 wherein said second reference value is set to a data value relating to said rotation within said predetermined range obtained in said first step.

6. The resolver signal processing method according to any one of claim 1–5, which is applied to a torque sensor so constructed that a twisting angle of said torsion bar is capable of being detected by said plural resolvers.

7. The resolver signal processing method according to any one of claim 1–5, which is applied to an angle sensor so constructed that an identical rotation is capable of being inputted to said plural resolvers.

8. The resolver signal processing method according to any one of claim 1–5 further comprising a fourth step for, if data value relating to said rotation obtained in said first step is not within a predetermined specific value range specified by said specific range at a initialization processing of the apparatus having said plural resolvers, setting the data value relating to the rotation to zero.

9. The resolver signal processing method according to any one of claim 1–5 further comprising a fifth step for, if the apparatus possesses the newest data value of those relating to said rotation obtained before the initialization of the apparatus having said plural resolvers and at said initialization processing, a difference between the data value relating to said rotation obtained by said first step or said second step and the data value relating to said rotation is not within a predetermined range, setting the data value of the rotation to zero.

10. A resolver signal processing apparatus for resolver signal for obtaining information about a rotations inputted to an end of a torsion bar whose other end is fixed, by computation based on a resolver signal outputted from plural resolvers attached to both ends of the torsion bar, said resolver signal processing apparatus comprising:

a first means for obtaining a first data value within a predetermined range of data values relating to rotations inputted to said plural resolvers based on data value relating to said rotation obtained from a known rotation input serving as a reference set as a first reference value;

a second means for obtaining a second data value out of the predetermined range of said inputted data values relating to the rotations based on a second reference value set to a different value from said first reference value; and a third means for obtaining information about a rotation inputted to an end of the torsion bar whose other end is fixed using said first data value and said second data value.

* * * * *